United States Patent
Teig et al.

(10) Patent No.: US 11,610,154 B1
(45) Date of Patent: Mar. 21, 2023

(54) PREVENTING OVERFITTING OF HYPERPARAMETERS DURING TRAINING OF NETWORK

(71) Applicant: Perceive Corporation, San Jose, CA (US)

(72) Inventors: Steven L. Teig, Menlo Park, CA (US); Eric A. Sather, Palo Alto, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 283 days.

(21) Appl. No.: 16/780,841

(22) Filed: Feb. 3, 2020

Related U.S. Application Data

(63) Continuation-in-part of application No. 16/453,622, filed on Jun. 26, 2019.

(60) Provisional application No. 62/913,707, filed on Oct. 10, 2019, provisional application No. 62/838,629, filed on Apr. 25, 2019.

(51) Int. Cl.
*G06N 20/00* (2019.01)
*G06N 5/02* (2006.01)

(52) U.S. Cl.
CPC .............. *G06N 20/00* (2019.01); *G06N 5/02* (2013.01)

(58) Field of Classification Search
CPC ............ G06N 3/08; G06N 3/04; G06F 17/16
See application file for complete search history.

(56) References Cited

U.S. PATENT DOCUMENTS

| | | |
|---|---|---|
| 10,019,654 B1 | 7/2018 | Pisoni |
| 10,572,979 B2 | 2/2020 | Vogels et al. |
| 10,970,441 B1 | 4/2021 | Zhang et al. |
| 10,984,560 B1 * | 4/2021 | Appalaraju ............ H04N 19/48 |
| 11,227,047 B1 * | 1/2022 | Vashisht ................. G06F 21/56 |
| 11,270,188 B2 * | 3/2022 | Baker ................... G06N 3/0481 |
| 2015/0340032 A1 | 11/2015 | Gruenstein |
| 2017/0061326 A1 | 3/2017 | Talathi et al. |
| 2017/0091615 A1 | 3/2017 | Liu et al. |
| 2017/0206464 A1 | 7/2017 | Clayton et al. |
| 2018/0068221 A1 | 3/2018 | Brennan et al. |
| 2018/0101783 A1 | 4/2018 | Savkli |
| 2018/0114113 A1 | 4/2018 | Ghahramani et al. |
| 2018/0293713 A1 | 10/2018 | Vogels et al. |
| 2019/0005358 A1 | 1/2019 | Pisoni |
| 2019/0114544 A1 | 4/2019 | Sundaram et al. |
| 2019/0138882 A1 | 5/2019 | Choi et al. |
| 2019/0286970 A1 | 9/2019 | Karaletsos et al. |

(Continued)

OTHER PUBLICATIONS

"Abolfalzi, (Differential Description Length for Hyperparameter Selection in Machine Learning), Feb. 13, 2019" (Year: 2019).*

(Continued)

*Primary Examiner* — Vincent Gonzales

(74) *Attorney, Agent, or Firm* — Adeli LLP

(57) ABSTRACT

Some embodiments provide a method for training a machine-trained (MT) network. The method uses a first set of inputs to train parameters of the MT network according to a set of hyperparameters that define aspects of the training. The method uses a second set of inputs to validate the MT network as trained by the first set of inputs. Based on the validation, the method modifies the hyperparameters for subsequent training of the MT network, wherein the hyperparameter modification is constrained to prevent overfitting of the modified hyperparameters to the second set of inputs.

18 Claims, 14 Drawing Sheets

(56) References Cited

U.S. PATENT DOCUMENTS

| | | |
|---|---|---|
| 2019/0340492 A1 | 11/2019 | Burger et al. |
| 2020/0051550 A1 | 2/2020 | Baker |
| 2020/0134461 A1 | 4/2020 | Chai et al. |
| 2020/0202213 A1 | 6/2020 | Rouhani et al. |
| 2020/0234144 A1 | 7/2020 | Such et al. |
| 2020/0285898 A1 | 9/2020 | Dong |
| 2020/0285939 A1 | 9/2020 | Baker |
| 2020/0311186 A1 | 10/2020 | Wang et al. |
| 2020/0311207 A1 | 10/2020 | Kim et al. |
| 2020/0334569 A1 | 10/2020 | Moghadam et al. |
| 2021/0142170 A1 | 5/2021 | Ozcan et al. |

OTHER PUBLICATIONS

"Leyton, (Auto-WEKA: Combined selection and hyperparameter optimization of classification algorithms), Mar. 6, 2013" (Year: 2013).*

"Maclaurin, (Gradient-based Hyperparameter Optimization through Reversible Learning), Jul. 2015" (Year: 2015).*

"Scikit, (3.1. Cross-validation: evaluating estimator performance), Apr. 16, 2019" (Year: 2019).*

"Cochrane, (Time Series Nested Cross-Validation), May 18, 2018" (Year: 2018).*

S. Russell and P. Norvig, Artificial Intelligence: A Modern Approach, 2nd Ed., 2003, chapt 18-21, pp. 649-789. (Year: 2003).*

Abolfazli M, Høst-Madsen A, Zhang J. Differential Description Length for Hyperparameter Selection in Machine Learning. arXiv preprint arXiv:1902.04699. Feb. 2019. (Year: 2019).*

Castelli, Ilaria, et al., "Combination of Supervised and Unsupervised Learning for Training the Activation Functions of Neural Networks," Pattern Recognition Letters, Jun. 26, 2013, 14 pages, vol. 37, Elsevier B.V.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Chandra, Pravin, et al., "An Activation Function Adapting Training Algorithm for Sigmoidal Feedforward Networks," Neurocomputing, Jun. 25, 2004, 9 pages, vol. 61, Elsevier.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

He, Kaiming, et al., "Delving Deep into Rectifiers: Surpassing Human-Level Performance on ImageNet Classification," Proceedings of the 2015 IEEE International Conference on Computer Vision (ICCV), Dec. 7-13, 2015, 9 pages, IEEE, Washington, DC, USA.

Jain, Anil K., et al., "Artificial Neural Networks: A Tutorial," Computer, Mar. 1996, 14 pages, vol. 29, Issue 3, IEEE.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kingma, Diederik P., et al., "Variational Dropout and the Local Reparameterization Trick," Proceedings of the 28th International Conference on Neural Information Processing Systems (NIPS '15), Dec. 7-12, 2015, 14 pages, MIT Press, Montreal, Canada.

Kumar, Ashish, et al., "Resource-efficient Machine Learning in 2 KB RAM for the Internet of Things," Proceedings of the 34th International Conference on Machine Learning, Aug. 6-11, 2017, 10 pages, vol. 70, PMLR, Sydney, Australia.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Louizos, Christos, et al., "Bayesian Compression for Deep Learning," Proceedings of Advances in Neural Information Processing Systems 30 (NIPS 2017), Dec. 4-9, 2017, 17 pages, Neural Information Processing Systems Foundation, Inc., Long Beach, CA, USA.

Molchanov, Dmitry, et al., "Variational Dropout Sparsities Deep Neural Networks," Feb. 27, 2017, 10 pages, arXiv:1701.05369v2, Computing Research Repository (CoRR)—Cornell University, Ithaca, NY, USA.

Nair, Vinod, et al., "Rectified Linear Units Improve Restricted Boltzmann Machines," Proceedings of the 27th International Conference on Machine Learning, Jun. 21-24, 2010, 8 pages, Omnipress, Haifa, Israel.

Non-Published Commonly Owned Related U.S. Appl. No. 16/453,619, filed Jun. 26, 2019, 47 pages, Perceive Corporation.

Non-Published Commonly Owned Related U.S. Appl. No. 16/453,622, filed Jun. 26, 2019, 47 pages, Perceive Corporation.

Non-Published Commonly Owned Related U.S. Appl. No. 16/780,842, filed Feb. 3, 2020, 70 pages, Perceive Corporation.

Non-Published Commonly Owned Related U.S. Appl. No. 16/780,843, filed Feb. 3, 2020, 70 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Srivastava, Nitish, et al., "Dropout: A Simple Way to Prevent Neural Networks from Overfitting," Journal of Machine Learning Research, Jun. 2014, 30 pages, vol. 15, JMLR.org.

Srivastava, Rupesh Kumar, et al., "Highway Networks," Nov. 3, 2015, 6 pages, arXiv:1505.00387v2, Computer Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Zilly, Julian Georg, et al., "Recurrent Highway Networks," Jul. 4, 2017, 12 pages, arXiv:1607.03474v5, Computer Research Repository (CoRR)—Cornell University, Ithaca, NY, USA.

Falkner, Stefan, et al., "BOHB: Robust and Efficient Hyperparameter Optimization at Scale," Proceedings of the 35th International Conference on Machine Learning, Jul. 10-15, 2018, 19 pages, Stockholm, Sweden.

Mackay, Matthew, et al., "Self-Tuning Networks: Bilevel Optimization of Hyperparameters Using Structured Best-Response Func-

(56) References Cited

OTHER PUBLICATIONS tions," Proceedings of Seventh International Conference on Learning Representations (ICLR '19), May 6-9, 2019, 25 pages, New Orleans, Louisiana.

Harmon, Mark, et al., "Activation Ensembles for Deep Neural Networks," Feb. 24, 2017, 9 pages, arXiv:1702.07790v1, Computing Research Repository (CoRR)—Cornell University, Ithaca, NY, USA.

Babaeizadeh, Mohammad, et al., "NoiseOut: A Simple Way to Prune Neural Networks," Proceedings of the 29th Conference on Neural Information Processing Systems (NIPS 2016), Nov. 18, 2016, 5 pages, ACM, Barcelona, Spain.

Neklyudov, Kirill, et al., "Structured Bayesian Pruning via Log-Normal Multiplicative Noise," Proceedings of the 31st Conference on Neural Information Processing Systems (NIPS 2017), Dec. 4-9, 2017, 10 pages, ACM, Long Beach, CA, USA.

Abolfazli, Mojtaba, et al., "Differential Description Length for Hyperparameter Selection in Machine Learning," May 22, 2019, 19 pages, arXiv:1902.04699, arXiv.org.

Huynh, Thuan Q., et al., "Effective Neural Network Pruning Using Cross-Validation," Proceedings of International Joint Conference on Natural Networks, Jul. 31-Aug. 4, 2005, 6 pages, IEEE, Montreal, Canada.

M., Sanjay, "Why and how to Cross Validate a Model?," Towards Data Science, Nov. 12, 2018, 4 pages, retrieved from https://towardsdatascience.com/why-and-how-to-cross-validate-a-model-d6424b45261f.

Zhang, Hongbo, "Artificial Neuron Network Hyperparameter Tuning by Evolutionary Algorithm and Pruning Technique," Month Unknown 2018, 8 pages.

Zhen, Hui-Ling, et al., "Nonlinear Collaborative Scheme for Deep Neural Networks," Nov. 4, 2018, 11 pages, retrieved from https://arxiv.org/abs/1811.01316.

Hansen, Katja, et al., "Assessment and Validation of Machine Learning Methods for Predicting Molecular Atomization Energies," Journal of Chemical Theory and Computation, Jul. 11, 2013, 16 pages, vol. 9, American Chemical Society.

\* cited by examiner

PREVENTING OVERFITTING OF HYPERPARAMETERS DURING TRAINING OF NETWORK

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

To train such networks, a common technique is to use a set of training inputs with known true outputs. These training inputs are run through the network, an error is calculated, and various techniques (e.g., back-propagation) are used to modify network parameters (e.g., weight values) in order to attempt to minimize a loss function that is based on this calculated error (and potentially other factors). Network training parameters, also called hyperparameters, affect how this training is performed. However, rigorous techniques for setting and/or modifying these hyperparameters are generally not used (instead, the hyperparameters are often manually set), which can result in overfitting or other non-optimal solutions for the network parameters.

BRIEF SUMMARY

Some embodiments of the invention optimize the training of the parameters of a machine-trained (MT) network by optimizing the tuning of a set of hyperparameters that define how the training of the MT network is performed. These hyperparameters, in various embodiments, may include coefficients in the loss function used to train the network (e.g., L1 and L2 regularization parameters), factors that define how the network parameters are modified during training (e.g., the learning rate), variational information bottleneck (VIB) or variational Bayes (VB) parameters, as well as other values. Rather than manually assigning these hyperparameters, some embodiments use optimization techniques to tune the hyperparameters in order to optimize the network training (thereby arriving at optimal or near-optimal network parameters).

Some embodiments tune the hyperparameters by using a training methodology in which the inputs used to train the network and the inputs used to validate the network change throughout the training. Specifically, some embodiments use a prequential technique for tuning the hyperparameters that iteratively trains the MT network by progressively adding data to the inputs used to train the network at each iteration. Between iterations, the hyperparameters are optimized by determining the error of the network as trained from the prior iteration when using a set of validation inputs, and modifying the hyperparameters to decrease this error. The set of validation inputs, or a portion thereof, are then added to the training inputs for the next iteration.

That is, for a particular iteration, a first set of training inputs are used to train the parameters of the MT network (e.g., the weight values for a neural network) using a first set of hyperparameters. Next, a set of validation inputs are used to compute an error for the MT network as trained by the first set of training inputs and modify the hyperparameters (i.e., to attempt to decrease/minimize this error). Some or all of this set of validation inputs are added to the first set of training inputs to create a second set of training inputs, which is then used to further train the parameters of the network according to the second set of hyperparameters. This process is repeated in some embodiments, with more of the validation inputs being transferred to the training inputs at each iteration (such that for each subsequent iteration, the set of training inputs is larger).

To better tune the hyperparameters, some embodiments attempt to minimize a description length score that specifies a description length of the MT network. However, rather than computing a description length based on, e.g., a number of bits required to describe the trained network (i.e., describe the parameters of the trained network), the description length score specifies a measure of the number of bits required to reconstruct the trained network through the prequential hyperparameter tuning technique. The optimization algorithm for the description length score thus seeks to minimize the sum of (i) the bits required to specify the correct output value for each new training input and (ii) the bits required to update the hyperparameters at each iteration.

To measure the bits required to specify the correct output value for each new training input, some embodiments employ the information theory concept of a sender and receiver. This concept assumes that both the sender and receiver have adequate computing resources to perform the MT network training, use the same training method, and start with the same randomized parameters so that the sender is always aware of the computations performed by the receiver (i.e., the sender always has knowledge of the receiver's version of the MT network). The sender also knows both the inputs (e.g., images, audio snippets, etc.) and the ground truth outputs (e.g., categories for images, face identifications, etc.), whereas the receiver initially only knows the inputs. While one measurement of the bits required to specify the correct output value to the receiver is simply the bits required to provide this information, because the sender can determine what the receiver's network will generate as output, this measurement can be minimized by noting that the sender need only specify the error correction bits. For a categorization network that outputs a probability for each possible category, the closer the receiver network is to outputting a (normalized) value of 1 for the correct category, the smaller the number of error correction bits required. Thus, the first term in the function to be minimized is an error measure of the network (i.e., the more predictive the network already is, the fewer bits required to provide the receiver with the next set of training inputs).

The value in minimizing the sum of the error correction bits and the hyperparameter update bits is that this represents a description of a network that is much more compressed than the entirety of the network parameters. Minimum description length theory states that the smaller (more compressible) the MT network (or any other model), the more predictive that network will be on new inputs (i.e., inputs not used during training).

In order to minimize this network description length (the sum of the error correction bits and the hyperparameter update bits), some embodiments perform hyperparameter optimization at each iteration. Specifically, the conceptual sender seeks to optimize the hyperparameters for the upcoming round of training by minimizing the combination of the hyperparameter updates and the error bits for the subsequent set of training inputs (i.e., not the training inputs added for the upcoming round of training, but rather the training inputs to be added for the following round of training), after the network is trained using the entire set of training inputs for the upcoming round of training (i.e., all of the previous training inputs as well as the newly added set of training inputs). Because the sender can replicate the training performed by the receiver, the sender has the ability to make this calculation. To perform this minimization, optimization techniques (e.g., gradient descent) are used to modify the hyperparameters.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention optimize the training of the parameters of a machine-trained (MT) network by optimizing the tuning of a set of hyperparameters that define how the training of the MT network is performed. These hyperparameters, in various embodiments, may include coefficients in the loss function used to train the network (e.g., L1 and L2 regularization parameters), factors that define how the network parameters are modified during training (e.g., the learning rate), variational information bottleneck (VIB) parameters, as well as other values. Rather than manually assigning these hyperparameters, some embodiments use optimization techniques to tune the hyperparameters in order to optimize the network training (thereby arriving at optimal or near-optimal network parameters).

Figure 1:
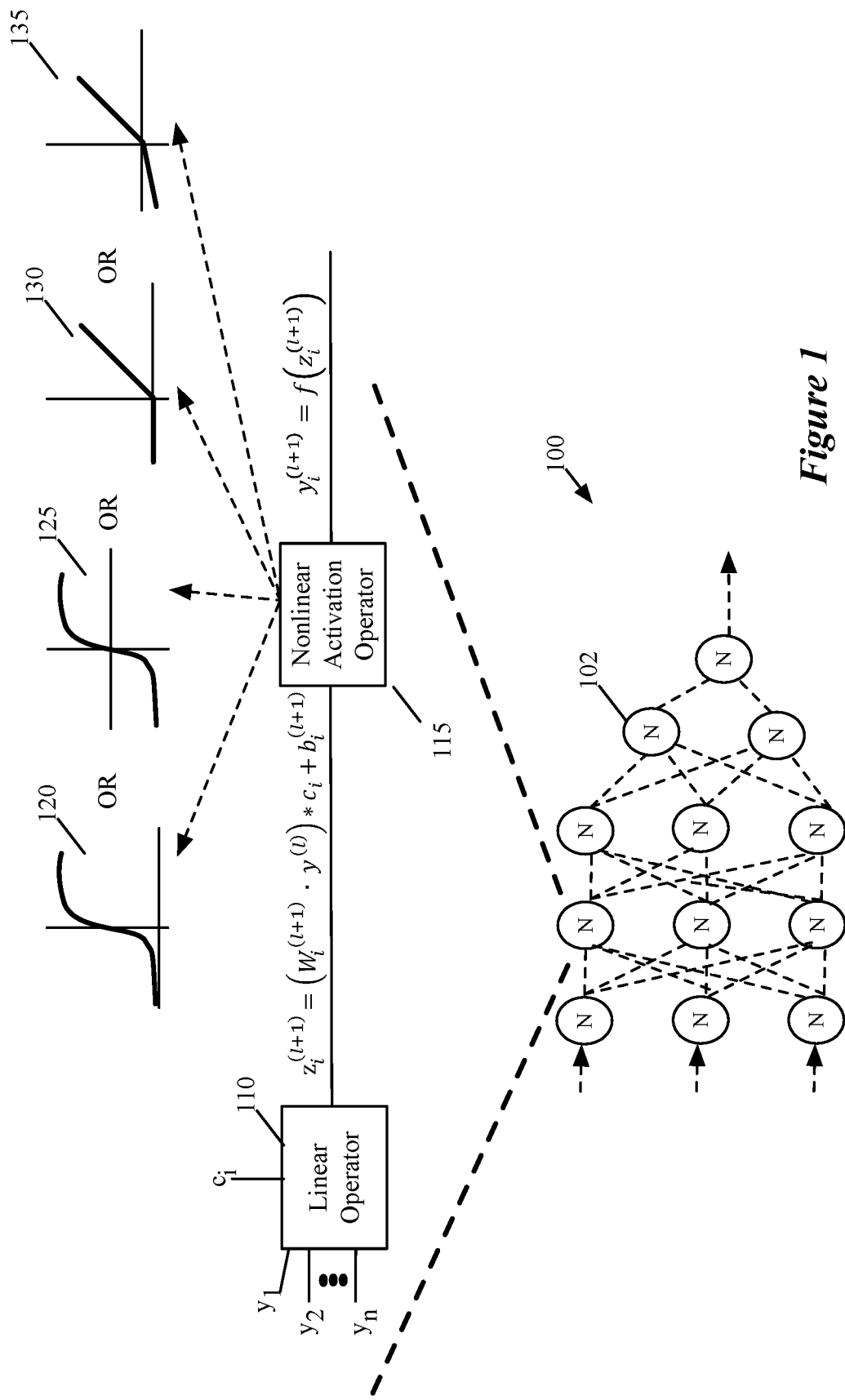
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable 1 can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$.

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (1)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y_i^{(l+1)}$ of the nonlinear component 115 of a node in layer l+1 is a function of the node's linear component, and can be expressed as by Equation (2) below:

$$y_i^{(l+1)} = f\left(z_i^{(l+1)}\right). \quad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (2) can be expressed in the following expanded format of Equation (3):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Figure 2:
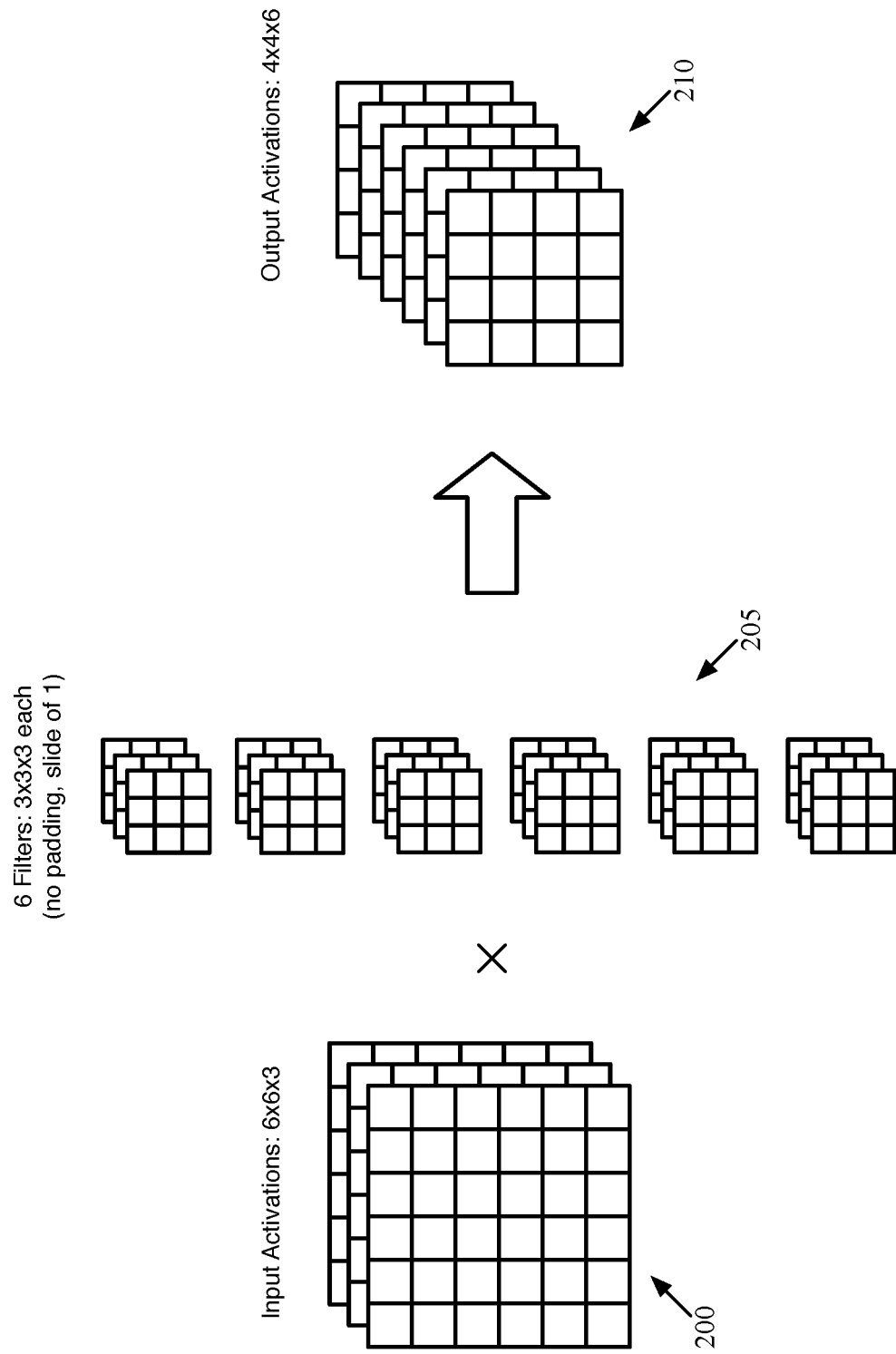
FIG. 2 conceptually illustrates a representation of a convolutional layer of a convolutional neural network.

As mentioned above, in some embodiments the machine-trained network is a convolutional neural network. FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values are 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which are 3×3×3. Each value in one of the filters is a weight value that is trained using the techniques described above. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filters 205 the output activations have six grids. Using a slide value of 1 with no zero-padding results in a 4×4 output grid for each filter. These output activation values 210 are then the input activation values for the next layer of the neural network.

Before a multi-layer network can be used to solve a particular problem (e.g., image classification, face recognition, etc.), the network is put through a supervised training process that adjusts the network's configurable parameters (e.g., the weight coefficients of its linear components). The training process uses different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

In some embodiments, this training process is governed by a set of training parameters, also referred to as hyperparameters. These hyperparameters define various factors about the training, such as how much the weights are modified during backpropagation, how much and how quickly certain factors in the loss function are changed during the course of a training run (e.g., to modify the relative importance of different factors in the loss function), how much regularization is factored in (i.e., how much the changes in the weights are dampened in order to avoid overfitting the weights to the specific inputs used for training), etc. In general, the better the hyperparameter values are set, the better the resulting network will be predictive for new input data that was not used for training.

Some embodiments tune the hyperparameters by using a training methodology in which the inputs used to train the network and the inputs used to validate the network change throughout the training. Specifically, some embodiments use a prequential technique for tuning the hyperparameters that iteratively trains the MT network by progressively adding data to the inputs used to train the network at each iteration. Between iterations, the hyperparameters are optimized by determining the error of the network as trained from the prior iteration when using a set of validation inputs, and modifying the hyperparameters to decrease this error. The set of validation inputs, or a portion thereof, are then added to the training inputs for the next iteration.

That is, for a particular iteration, a first set of training inputs are used to train the parameters of the MT network (e.g., the weight values for a neural network) using a first set of hyperparameters. Next, a set of validation inputs are used to compute an error for the MT network as trained by the first set of training inputs and modify the hyperparameters (i.e., to attempt to decrease/minimize this error). Some or all of this set of validation inputs are added to the first set of training inputs to create a second set of training inputs, which is then used to further train the parameters of the network according to the second set of hyperparameters. This process is repeated in some embodiments, with more of the validation inputs being transferred to the training inputs at each iteration (such that for each subsequent iteration, the set of training inputs is larger).

Figure 3:
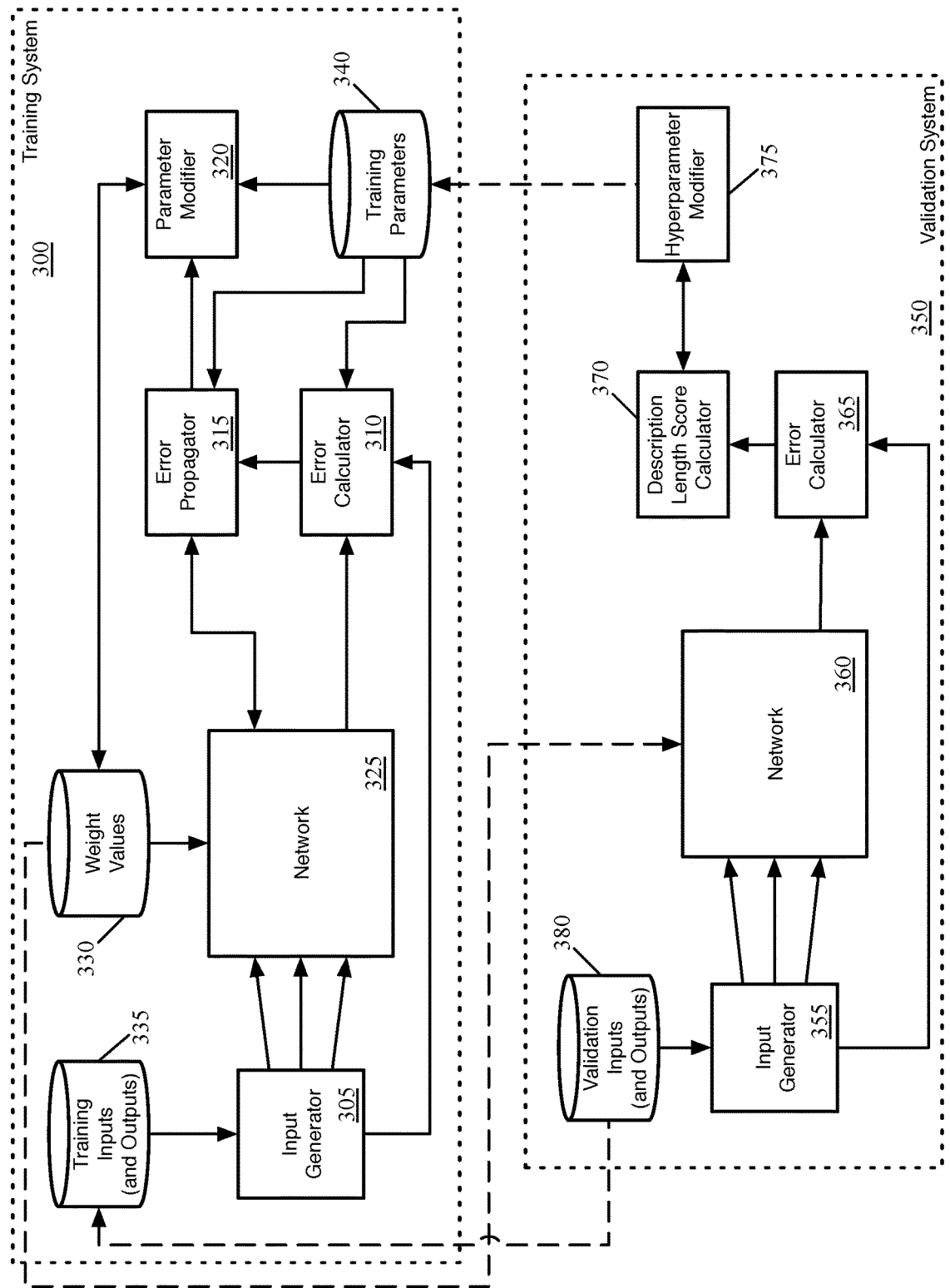
FIG. 3 conceptually illustrates a training system of some embodiments that iteratively adds inputs from a validation set to the training set over the course of multiple training runs.

FIG. 3 conceptually illustrates a training system 300 of some embodiments that iteratively adds inputs from a validation set to the training set over the course of multiple training runs. The training system 300 uses a validation system 350 to test the predictivity of the trained network after each iteration and uses a description length score based on (i) potential hyperparameter modifications and (ii) the error generated for validation set inputs when incorporating these potential modifications in order to determine optimal hyperparameter modifications at each iteration. The training system 300 modifies the parameters (e.g., weight values) for a machine-trained network over the course of these multiple training iterations, and the resulting network can then be used for its particular purpose (e.g., embedded on a device).

As shown, the training system 300 includes an input generator 305, an error calculator 310, an error propagator 315, and a parameter modifier 320. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power.

In some embodiments, the system initially receives a multi-layer network (including initial weight values), inputs for the network, and expected outputs for these inputs. The network 325 of some embodiments is a multi-layer machine-trained network, such as that shown in FIG. 1 (e.g., a neural network with some combination of convolutional layers, fully-connected layers, residual layers, etc.). It includes multiple layers of nodes, including a layer of input nodes, at least one layer of hidden nodes, and a layer of output nodes. Each hidden node and output node includes a linear component (that uses the weight values 330) and a non-linear activation function. The network 325 receives an input (e.g., an image, an audio snippet, a sequence of images, etc.) and generates a corresponding output.

The weight values 330 are used to parametrize the network, and are trained by the system 300 for the network to perform a particular task. In some embodiments, these weights are initialized using a probabilistic distribution for each layer. That is, in some embodiments, the weights within each layer are selected randomly from a Gaussian distribution. Depending on the characteristics of the network being trained, all the weights in any given layer may be forced during training to one of a set of discrete candidate values (e.g., with the candidate set for a layer being $\{0, \alpha_k, -\alpha_k\}$, with different values of $\alpha_k$ for each layer k).

For the training inputs 335, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The input generator 305 selects a set of inputs (and corresponding outputs) from the sets of inputs and outputs 335. In addition, in some embodiments, the input generator 305 breaks up the inputs into constituent values to be fed into the input layer of the network 325. For instance, for a network being trained for face recognition, the input generator might simply divide the pixels into several sections, arrange the pixels into red, blue, and green (or luma and chroma) channels, or perform computations based on the pixel values and feed these to the input layer. That is, based on the stored input 335 (e.g., an image), the input generator 305 might perform a set of computations in order to generate the inputs for the input layer of the network 325.

The network 325 processes the set of inputs through the network to obtain predicted outputs (i.e., outputs predicted according to the current state of the network 325). Each input propagates through the processing nodes of the network 325, with each layer of nodes receiving their one or more inputs and generating an output to pass to the next layer of nodes. In the final output layer, one or more nodes receives the outputs from the previous layer and generates the outputs of the network. In some embodiments, this processing entails, for each node, the linear component first computing a weighted sum of its input values (according to the current weight values 330), and then the non-linear activation function computing an output based on this weighted sum. For certain training techniques that aim to achieve certain criteria with respect to the weight values (e.g., a small discrete set of weight values for each layer, a large percentage of the resultant weight values being set to 0, etc.), certain calculations are performed for each node (e.g., treating the weight values as a probability distribution, calculating the mean and variance for each weight, and then using these along with the node input values to compute an output mean and variance for each node).

The error calculator 310 then computes the error for the input set. In some embodiments, the error calculator 310 computes the error for each individual input as the network 325 generates its output. The error calculator 310 receives both the predicted output from the input generator 305 and the output of the network 325, and uses a loss function that quantifies the difference between the predicted output and the actual output for each input. Some embodiments compute this as a simple difference, or absolute value of the difference, between the two values; other embodiments compute the square of the differences, or other such measure. In addition, some embodiments sum or average the loss function value for each input in a set of inputs (i.e., batch of inputs). This calculated error is passed to the error propagator 315 in some embodiments.

The error calculator 310 also adds any additional terms used to bias the training in different ways (e.g., biasing the weights towards predefined discrete values for each weight and/or to ensure that a threshold percentage of the weights end up at the value 0). Examples of such loss function terms and their use in training are described in greater detail in U.S. patent application Ser. No. 15/815,222 (filed Nov. 16, 2017), now issued as U.S. Pat. No. 11,113,603, and U.S. patent application Ser. No. 15/921,622 (filed Mar. 14, 2018), now issued as U.S. Pat. No. 11,537,870, both of which are incorporated herein by reference. Some of these loss function terms may include hyperparameters. For example, biasing terms may include scaling hyperparameters that allow the relative weight of those terms to be modified, regularization terms may include hyperparameters, etc.

Next, the error propagator 315 back-propagates the error (including any constraint terms) to determine the rate of change of the error with respect to a change of each weight value. In typical training (i.e., without any additional penalty terms), the loss function is back-propagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network.

Specifically, if L is the combined loss function (including the penalty terms), then the backpropagation computes, for each weight $w_{ik}$, the partial derivative $$\frac{\partial L}{\partial w_{ik}}.$$

Because the weights are isolated in a node's output computation as well as (typically) in any constraint terms, computing these partial derivatives is not difficult via application of the chain rule. In this sense, the loss function is a function in many-dimensional space (i.e., with the various weight coefficients being the many dimensions), and the nature of the function means that the effect of each weight value can be easily isolated for a given loss function value.

The parameter modifier 320 adjusts the weight values based on the relative rates of change and a training rate factor. That is, the error propagator 315 provides, for each weight value $w_{ik}$, the partial derivative of the loss function with respect to that $w_{ik}$. These partial derivatives are used to update the weight values by moving the weight values in the direction opposite the gradient (to attempt to reduce the loss function value) by a particular amount, with a larger partial derivative for a particular weight (i.e., a component of the gradient) resulting in a greater change to that weight. The parameter modifier 320 of some embodiments uses a training rate hyperparameter (also referred to as a learning rate) from the training parameters 340 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the learning rate specifies the distance of that move. Specifically, for each weight value $w_{ik}$, with a learning rate r, the weight modifier updates this weight value using the following equation.

$$w_{ik(updated)} = w_{ik} - \left(r * \frac{\partial L}{\partial w_{ik}}\right) \qquad (4)$$

After the weights (and any other network parameters) are updated, the training system 300 can continue to perform additional training. Some embodiments use a minimization process (e.g., a stochastic gradient descent minimizer) to determine when to stop training the network. In some embodiments, the system 300 only stops training the network once certain thresholds for the weight have been met (e.g., that a large enough percentage of the weight values have been set to zero). In some embodiments, the input generator 305 determines whether to perform more training; in other embodiments, a different module (e.g., a module not shown in FIG. 3 makes this determination).

As mentioned, some embodiments perform multiple training runs with changing training inputs 335, and perform validation using the validation system 350 to determine how predictive the network parameters are after each training run. In addition, the validation system 350 is used to modify the training parameters 340 in order to optimize the resulting network. As shown, the validation system 350 includes an input generator 355, a network 360, an error calculator 365, a description length score 370, and a hyperparameter modifier 375.

The validation system receives the weight values 330 (and any other parameters of the network 360) as trained by the training system 300 and measures the predictiveness of this network. The network 360 has the same structure as the network 325 used for training, and is used to validate the training by determining how predictive the weight values 330 are for inputs that were not used for training. One key for testing machine-trained networks is that the validation inputs used to measure a network's predictiveness should not be inputs used during training (as these will not be indicative of predictiveness). However, over the course of multiple training runs, it is possible to use some inputs as validation inputs after a first training run, then add these inputs to the set of training inputs for the next training run (so long as these inputs are not used for any future validation).

The error calculator 365 calculates the error in the network output for the validation inputs 380, in order to measure the predictiveness of the network after a training run. Because the validation system 350 is not modifying the weight values, this error is not used for backpropagation to modify the weights. Instead, a description length score calculator 370 uses the measured error in some embodiments, along with additional information (e.g., possible hyperparameter modifications, calculations of error due to those possible modifications) in order to calculate a description length score (and attempt to minimize this score).

As mentioned above, hyperparameter tuning is typically a difficult process, and many training systems use guesswork to modify the hyperparameters. However, to better tune these hyperparameters, some embodiments attempt to minimize a description length score that specifies a description length of the trained network (e.g., a number of bits required to describe the network). One possible calculation for such a description length is the number of bits to describe the parameters of the trained network (which would push weight values to 0). However, rather than computing the description length score based on this metric, in some embodiments the description length score calculator 370 uses a measure of the number of bits required to reconstruct the trained network through a prequential hyperparameter tuning technique. The optimization algorithm for the description length score thus seeks to minimize the sum of (i) the bits required to specify the correct output value for each new training input and (ii) the bits required to update the hyperparameters at each iteration.

To measure the bits required to specify the correct output value for each new training input, some embodiments employ the information theory concept of a sender and receiver. This concept assumes that both the sender (e.g., the validation system 350) and receiver (e.g., the training system 300) have adequate computing resources to perform the training algorithm, use the same training method, and start with the same randomized parameters so that the sender is always aware of the computations performed by the receiver (i.e., the validation system 350 always has knowledge of the training system 300 version of the network, and how that network will be modified based on the new training inputs added each iteration). In this conception, the sender also knows both the inputs (e.g., images, audio snippets, etc.) and the ground truth outputs (e.g., categories for images, face identifications, etc.), whereas the receiver initially only knows the inputs.

While one measurement of the bits required to specify the correct output value to the receiver (i.e., for the validation system 350 to indicate the ground truth output for each new training input) is simply the bits required to provide this information, because the validation system can determine what the training system's network will generate as output, this measurement can be minimized by noting that the sender need only specify the error correction bits (i.e., the bits needed to get from the network output to the correct output). For a categorization network that outputs a probability for each possible category, the closer the receiver network is to outputting a (normalized) value of 1 for the correct category, the smaller the number of error correction bits required. Thus, the first term in the function to be minimized is an error measure of the network (i.e., the more accurate the network already is, the fewer bits required to provide the receiver with the next set of training inputs). While initially this may be a larger number of bits, once the network has been through a training run, the size of the error description should decline quickly.

The value in minimizing the sum of the error correction bits and the hyperparameter update bits is that this represents a description of a network that is much more compressed than the entirety of the network parameters. Minimum description length theory states that the smaller (more compressible) the network, the more predictive that network will be on new inputs (i.e., inputs not used during training). As such, because the goal of training the network is to have as predictive a network as possible (e.g., avoiding overfitting), the description length score calculator 370 attempts to minimize this description length score.

Thus, in order to minimize this network description length (the sum of the error correction bits and the hyperparameter update bits), the hyperparameter modifier 375 of some embodiments performs hyperparameter optimization at each iteration. Specifically, the validation system 350 (the conceptual information theory sender) seeks to optimize the hyperparameters for the upcoming round of training by minimizing the combination of the hyperparameter updates and the error bits for the subsequent set of training inputs (i.e., not the training inputs added for the upcoming round of training, but rather the training inputs to be added for the following round of training), after the network is trained using the entire set of training inputs for the upcoming round of training (i.e., all of the previous training inputs as well as the newly added set of training inputs). Because the validation system 350 (the sender) can replicate the training performed by the training system 300 (the receiver), the validation system 350 has the ability to make this calculation.

To perform this minimization, optimization techniques (e.g., gradient descent) are used to modify the hyperparameters. The hyperparameter modifier 375, in concert with the description length score calculator 370, determines the optimal modifications to the hyperparameters 340 at each iteration, and provides these updates to the training system 300. These modifications, for example, might modify the learning rate from one training iteration to another (i.e., to modify the rate at which weight values are changed during backpropagation), increase or decrease regularization factors (which tend to push weight values towards 0 in order to reduce overfitting), or modify other hyperparameters (as mentioned, the specific hyperparameters used will depend on the specific training algorithm and loss function used by the training system 300).

It should be understood that FIG. 3 illustrates one example of a conceptual training/validation system, and that other systems may embody the invention and perform similar functions as well. For instance, some embodiments do not use a separate validation system, but rather use the same modules for training and validation, so long as inputs are not used for validation once they have been used for the actual network training.

Figure 4:
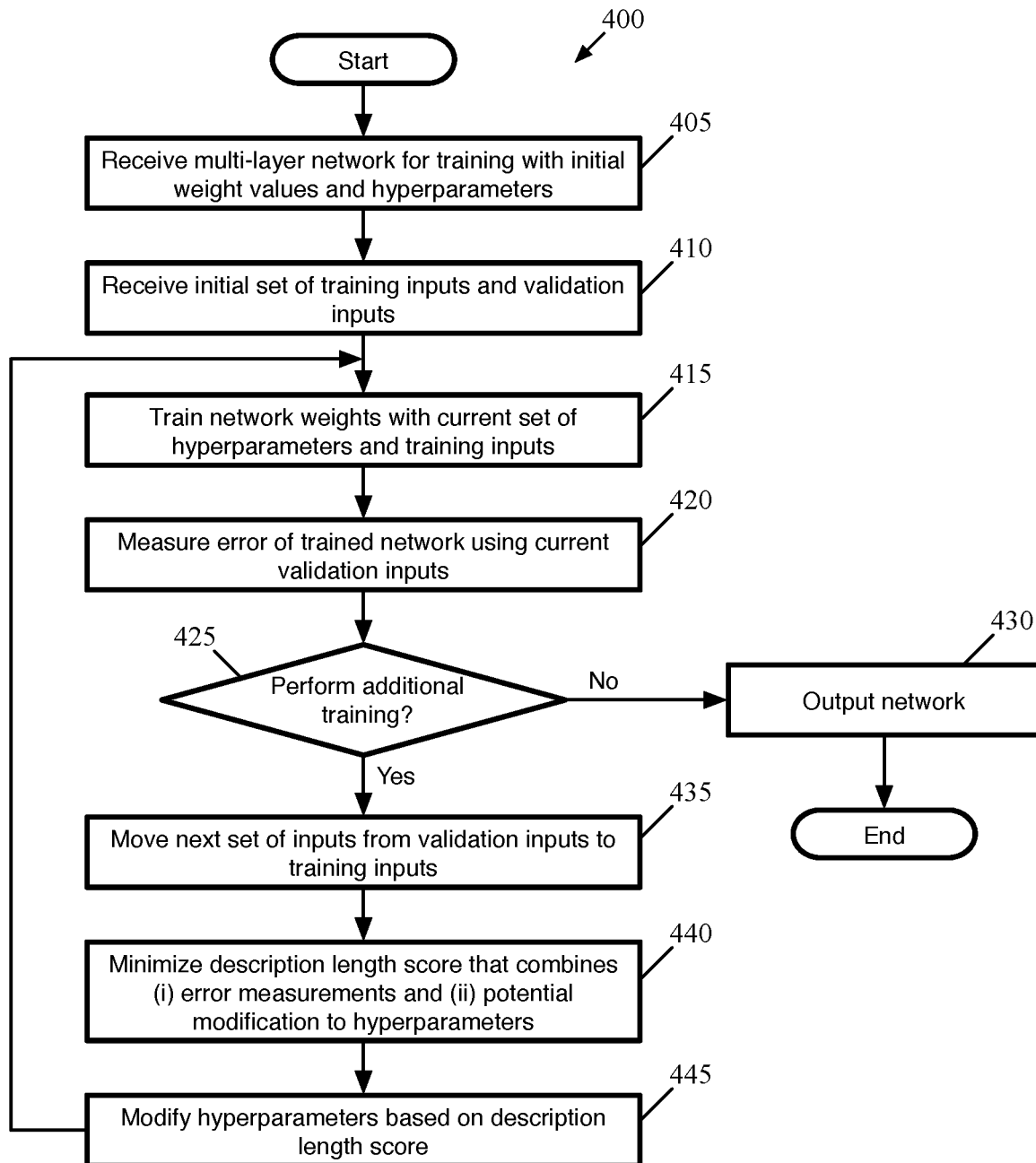
FIG. 4 conceptually illustrates a process of some embodiments for training a network while optimizing hyperparameter values used in that training.

FIG. 4 conceptually illustrates a process 400 of some embodiments for training a network while optimizing hyperparameter values used in that training (in order to best optimize the training of the network). The process 400 is used to optimize the resultant network such that the network will be maximally predictive (i.e., will provide the best results for new inputs not used in training of the network). In some embodiments, the process 400 is performed by the training system 300 and validation system 350, or a similar combined system. The process 400 will be described in part by reference to FIG. 5, which conceptually illustrates the transfer of inputs from the validation set to the training set over several iterations.

As shown, the process 400 begins by receiving (at 405) a multi-layer network to be trained, along with initial weight values and hyperparameters. In some embodiments, a network definition specifies the structure of the network (i.e., the number of input nodes, the number of layers and type of each layer, the filter structures for convolutional layers, etc.). The initial weight values may be generated randomly in some embodiments (e.g., randomly assigning each weight a value between −1 and 1). The initial hyperparameter values may be assigned randomly (within an acceptable range for each hyperparameter) or manually in different embodiments.

Next, the process 400 receives (at 410) an initial set of training inputs and validation inputs. Specifically, in some embodiments, the training system receives the training inputs while the validation system receives the validation inputs (and is also allowed to have knowledge of the training inputs). In some embodiments, the validation system also calculates the error bits required to provide the training system with the initial set of training inputs, as this data is used for computing the minimum description length score (which requires the inclusion of the bits needed to describe all of the training inputs used).

Figure 5:
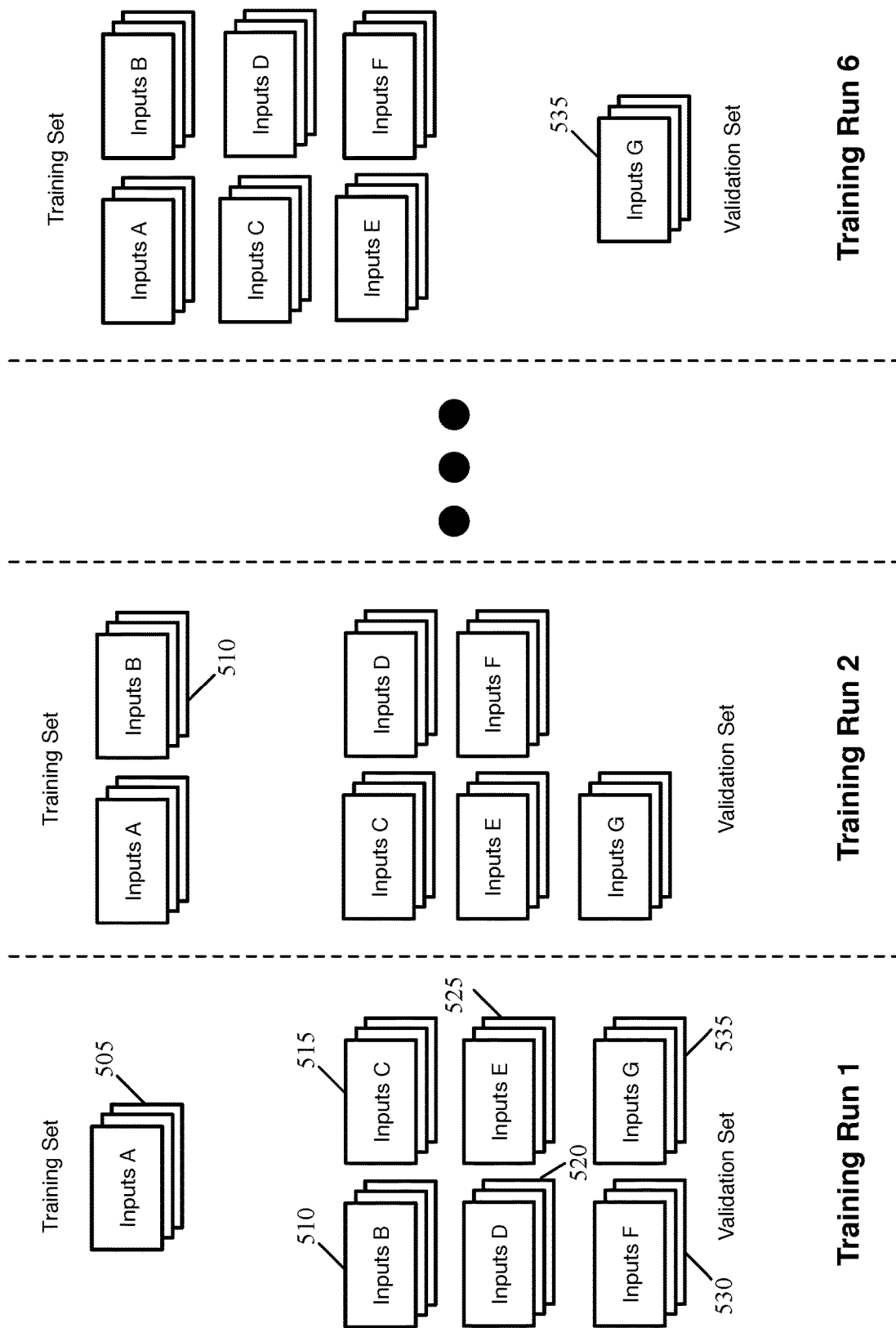
FIG. 5 conceptually illustrates the transfer of inputs from the validation set to the training set over several iterations.

FIG. 5 illustrates that at a first iteration of the network training system, a first set of inputs 505 are in the training set, while numerous additional sets of inputs 510-535 are used for validation. Where this figure shows a set of inputs, it should be understood that this represents both the input as well as a ground truth network output. Depending on the type of network being trained, these inputs may be images, audio snippets, video snippets, etc. Similarly, depending on the network, the ground truth outputs could be categories (e.g., identifying the correct category from a set of possible output categories for an image or other input), binary determinations (e.g., specifying whether a particular audio snippet is a human voice), or other appropriate network outputs.

Next, the process 400 trains (at 415) the network weights using the current set of training inputs and the current hyperparameters. At the first iteration, this will be the initial set of training inputs, whereas for later iterations this will include input items that were previously part of the validation inputs (and in some embodiments also include the initial training inputs). For the hyperparameters, the first training run uses the initially set values (e.g., manually set hyperparameter values). As mentioned above, different embodiments use different training techniques (e.g., quantized parameter values, variational Bayes, variational information bottleneck, etc.) to attempt to optimize the parameter values for predictiveness (as well as additional factors such as sparsity of non-zero values).

The process 400 then measures (at 420) the error of the trained network using the current validation inputs. As mentioned, using the validation inputs (i.e., inputs not used in training the network) allow the predictiveness of the network to be measured. In addition, the error of the network is used in calculating the description length score, though in some embodiments the description length score uses the future error after a subsequent training run in determining the description length score and optimizing the hyperparameters. FIG. 5 illustrates that in a first iteration of the training and validation cycle, the validation set used to determine network predictiveness is very large.

The process 400 then determines (at 425) whether to perform additional training. Some embodiments always perform training iterations until the entire validation set has been added to the training set, irrespective of the error measurement. Other embodiments, however, stop performing training if the network is adequately predictive on the remaining validation inputs. Once additional training is no longer required, the process 400 outputs (at 430) the network (i.e., outputs the network parameters).

On the other hand, if additional training is required, the process 400 moves (at 435) a next set of inputs from the validation inputs to the training inputs. In some embodiments, these inputs moved to the training inputs are some of the inputs most recently used for validation (i.e., at 420). As shown in FIG. 5, not all of the validation inputs used for the most recent round of predictiveness testing are moved to the training set; instead, only a subset of these inputs are transferred at each iteration. For instance, after the first iteration of training, the set of inputs 510 is transferred from the validation set to the training set for the second training iteration. In this example, over the course of several iterations, all but the last remaining set of inputs 535 are transferred from the validation set to the training set. In addition, for a final iteration, some embodiments transfer the last set of inputs to the training set, and perform a final round of training using these inputs as well.

Next, the process 400 attempts to minimize (at 440) a description length score that combines (i) error measurements and (ii) potential modifications to hyperparameters. In some embodiments, as mentioned, the error measurement used for the description length score is a measure of the error for a next set of validation inputs to be added to the training set, not the set of validation inputs just moved to the training set. As described above, because the sender can replicate the training performed by the receiver, the sender has the ability to make this calculation. To perform this minimization, optimization techniques (e.g., gradient descent) are used to modify the hyperparameters. Specifically, some embodiments compute (or at least estimate) the gradient of the description length score with respect to a vector of hyperparameters.

To measure the error bits for the description length score, some embodiments use a system of codebooks. Specifically, for a categorization network, some embodiments define a meta-codebook with one codebook for each category. For each set of training inputs, the bit cost according to the current meta-codebook is added to the description length score. For instance, the bit cost for an input assigned to category i by the training system that is actually ground-truth category j would have a bit cost of $-\log(\text{code}_{ij}/\Sigma\text{code}_{ik})$. Using the sender/receiver formulation, the codebook for a category i is updated by accumulating the number of assignments by the receiver's network of a new input to category i when it is from the true category j (noting that i and j may be identical). A codebook would be used by first normalizing its counts to probabilities that add to 1 by dividing by their sum. In some embodiments, the initial (first iteration) meta-codebook consists of $\text{code}_{ij}=1$ representing a uniform (uninformed) distribution of categories for the first set of training inputs (before the network is trained). For a subsequent set of inputs to be added to the training set, the algorithm adds 1 to $\text{code}_{ij}$ if an input is assigned to category i and is actually of category j. Some embodiments also add 1 to each diagonal entry $\text{code}_{ij}$ in anticipation of the improvement in the next training run. Other embodiments measure the error by using $\log(1/p)$ as a measure of the bits needed to communicate each input, where p is the normalized categorization probability for the correct category for a given input output by the network (trained using the updated hyperparameters) for that input. Thus, as $p \to 1$, the number of error bits for that input approaches 0 (i.e., the more predictive the network is after being trained with a new set of hyperparameters, the fewer bits required to provide the next set of inputs).

Meanwhile, the hyperparameter modification bits added to the description length score increase with the size of the change for each hyperparameter in some embodiments. Some embodiments use a set (e.g., 8) of discrete possible hyperparameter values and use a code that specifies to either keep the same hyperparameter, decrease by one value within the predefined set, or increase by one value within the predefined set. At each iteration, the total description length score is minimized for that iteration and added to the total score. This description length score (accounting for hyperparameter modification bits) should be smaller than an upper bound that can be set on the score in the case in which the hyperparameters are not modified throughout training. In this upper bound case, the error bits for providing each new set of training inputs are computed and added to the score at each iteration, assuming the hyperparameters are held constant. By optimally modifying the hyperparameters (and therefore trading hyperparameter modification bits for error bits), an overall score can ideally be achieved.

Based on this minimization, the process modifies (at 445) the hyperparameters. The process then returns to 415 to train the network weights using the new set of hyperparameters and the training inputs including the inputs newly added at 435. As mentioned, some embodiments continue until either the network is adequately predictive or until all of the validation inputs have been added to the training set.

Before describing several examples of hyperparameter tuning, variational information bottleneck (VIB) and its hyperparameters will be described. At a high level, the information bottleneck loss function is an information theoretic loss function for training classifier neural networks of some embodiments (i.e., neural networks that sort inputs, such as images, into classifications). An information bottleneck (TB), in some embodiments, trains the network to discard portions of information from input data that are not useful for deducing the correct classification. Only information relevant to making the correct classification on input data is allowed to pass through the "bottleneck" network. This removal of unnecessary information reduces overfitting by preventing the network from learning the noise in the training set.

Figure 6:
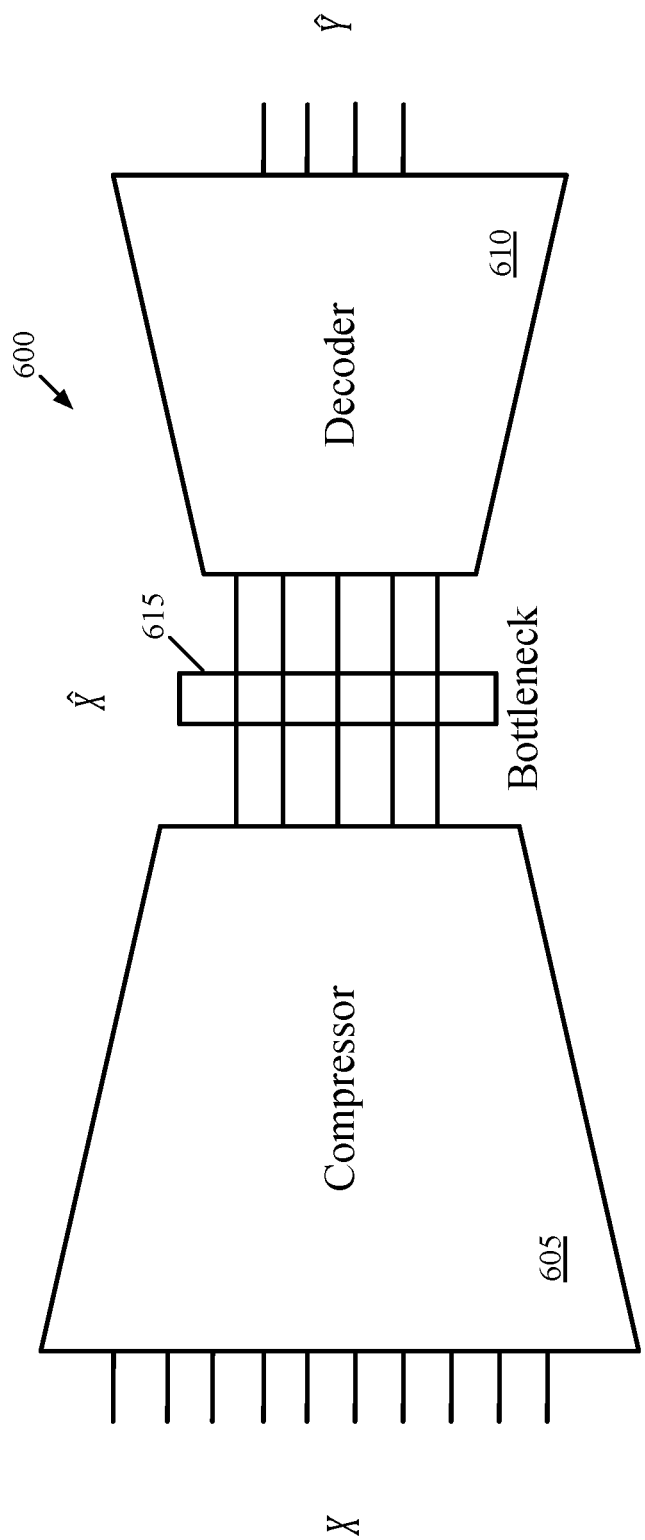
FIG. 6 conceptually illustrates an information bottleneck network of some embodiments that can be logically divided into separate compressor and decoder stages.

FIG. 6 conceptually illustrates an IB network 600 of some embodiments that can be logically divided into separate compressor and decoder stages 605 and 610. The bottleneck 615 is a designated intermediate value computed within the network that is subjected to a constraint that limits that amount of information that is passed between the stages. The training process trains both stages simultaneously to produce correct classifications at the output of the network while satisfying the bottleneck constraint at the intermediate point in the network.

The IB loss function of some embodiments uses a mutual information function to quantitatively measure information in units of bits:

$$L_{IB} = I(X; \hat{X}) - \beta I(\hat{X}; Y) \tag{5}$$

In this loss function, X is a random variable representing an input datum (e.g., an entire image represented as a single large number). $\hat{X}$ is a discrete random variable with alphabet $\hat{\chi}$ for the intermediate value computed within the network that is the designated bottleneck. The output of the network $\hat{Y}$ is the hypothesized classification of X (over alphabet Y that includes all possible categories). The random variable Y is the ground truth classification for the input datum.

The first term in the loss function, $I(X; \hat{X})$ measures the mutual information between the input data and the bottleneck variable. Thus, minimizing the loss function involves minimizing this mutual information term: the goal is for the variable $\hat{X}$ to contain minimal information about the input of the network X The second term $\beta I(\hat{X}; Y)$ indicates that the bottleneck variable should contain information about the ground truth Y. As this term has a negative coefficient, minimizing the loss function involves maximizing this term. Together these terms serve to discard as much information as possible while keeping useful information at the bottleneck. The β coefficient is a manually specified constant that controls the relative importance of compressing information versus preserving useful information. This β coefficient is a hyperparameter that can be tuned using the above-described methods in some embodiments, allowing the system to discard controlled amounts of useful information if doing so results in superior compression.

During optimization, the expected behavior for these terms is that $I(X; \hat{X})$ will start at a large value and decrease over time, while $\beta I(\hat{X}; Y)$ will start as a small value and increase. This corresponds to the network learning how to compress unnecessary bits out of the input data and how to decode the correct category from the remaining bits.

However, if the number of symbols in the alphabet $\hat{\chi}$ is equal to the number of categories in the alphabet $\mathcal{Y}$ (i.e., $|\hat{\chi}|=|\mathcal{Y}|$), then the entropy $H(\hat{X})$ (and thus $I(X; \hat{X})$) is at most $H(Y)$. In order for the network to be perfectly accurate, $I(\hat{X}; Y)$ should also be equal to $H(Y)$. Thus, $I(X; \hat{X})$ should reach its theoretical maximum during optimization, and will likely have a smaller value than its initial state, which contradicts the intuition described above that $I(X; \hat{X})$ will decrease as the network learns to compress. In addition, if $I(X; \hat{X})$ is initially less than the maximum possible value, then the network is already discarding important bits of information. In some embodiments, defining $\hat{\chi}$ to have the same number of symbols as y has categories does not leave room for $\hat{X}$ to contain a superset of the information in Y.

The following describes the information bottleneck concept using a particular image as an example. As such an example, an image might contain a black cat, showing various details about the cat (e.g., its eyes, whiskers, etc.) as well as details about the surrounding scene. If the network does not discard any information, then all of the information regarding the cat and surrounding scene would pass through from X to $\hat{X}$ and I(X; $\hat{X}$) would equal the entire image. Knowing g, one could recreate the original picture X perfectly. If the network discarded all but the specific information of the existence of a black cat, then I(X; $\hat{X}$) would equal this much smaller amount of information. In this latter case, there is no longer enough information in g to know X exactly (e.g., no information about the cat's facial details, its pose, or the surrounding scene is preserved). Ideally, this minimal information is enough to deduce the ground truth classification Y. If the proper classification is "cat", then the classification will be accurate, and the I($\hat{X}$; Y) term will have a maximum value (because the critical information made it through the bottleneck). If the ground truth is actually "Bombay cat", I($\hat{X}$; Y) will have some medium value, in that g tells us something but not everything about the correct classification. On the other hand, if the network only keeps identification of the eye color (but not that the eyes belong to a cat), which isn't relevant to the classification, then I($\hat{X}$; Y) would be zero.

For the computation of the loss function, the following terms are used:

$x_i$: network input data for training datum i
$\hat{X}_i$: designated bottleneck discrete random variable for training datum i (with alphabet $\hat{X}$)
$p_{ij}$: probability that $\hat{X}_i$=j, where j ∈ $\hat{X}$
$Y_i$: ground truth label of training datum i (with alphabet $\mathcal{Y}$)
$\hat{Y}_i$: output of the neural network for training datum i
$p_{ik}$: probability that $\hat{Y}_i$=k, where k ∈ $\mathcal{Y}$
$\delta_j$: mean probability over all training data that $\hat{X}$=j
$\delta_{kj}$: mean probability over all training data in true category k that $\hat{X}$=j
$m_i$: mass of training datum i
$M_k$: total mass of all training data in true category k
M: total mass of all training data The mutual information terms I(X; $\hat{X}$) and/I($\hat{X}$; Y) can be defined in terms of $p_{ij}$ using the following equations:

$$\delta_j = \frac{1}{M} \sum_i m_i p_{ij} \qquad (6)$$

$$\delta_{kj} = \frac{1}{M_k} \sum_{i:Y_i=k} m_i p_{ij} \qquad (7)$$

$$I(X;\hat{X}) = H(\hat{X}) - H(\hat{X}|X) \qquad (8)$$

$$= -\sum_j \delta_j \log \delta_j + \frac{1}{M} \sum_i m_i \sum_j p_{ij} \log p_{ij}$$

$$I(\hat{X}; Y) = H(\hat{X}) - H(\hat{X} | Y) \qquad (9)$$

$$= -\sum_j \delta_j \log \delta_j + \frac{1}{M} \sum_k M_k \sum_j \delta_{kj} \log \delta_{kj}$$

The gradients with respect to $p_{ij}$ are given by the following:

$$\frac{\partial I(X;\hat{X})}{\partial p_{ij}} = -\sum_{j'}\left((1+\log \delta_{j'})\frac{\partial \delta_{j'}}{\partial p_{ij}}\right) + \frac{m_i}{M}(1+\log p_{ij})$$

$$= -\frac{m_i}{M}(1+\log \delta_j) + \frac{m_i}{M}(1+\log p_{ij}) \qquad (10)$$

$$= \frac{m_i}{M} \log \frac{p_{ij}}{\delta_j}$$

$$\frac{\partial I(\hat{X}; Y)}{\partial p_{ij}} = -\frac{m_i}{M}(1+\log \delta_j) + \frac{m_i}{M}(1+\log \delta_{Y_i j}) \qquad (11)$$

$$= \frac{m_i}{M} \log \frac{\delta_{Y_i j}}{\delta_j}$$

Figure 7:
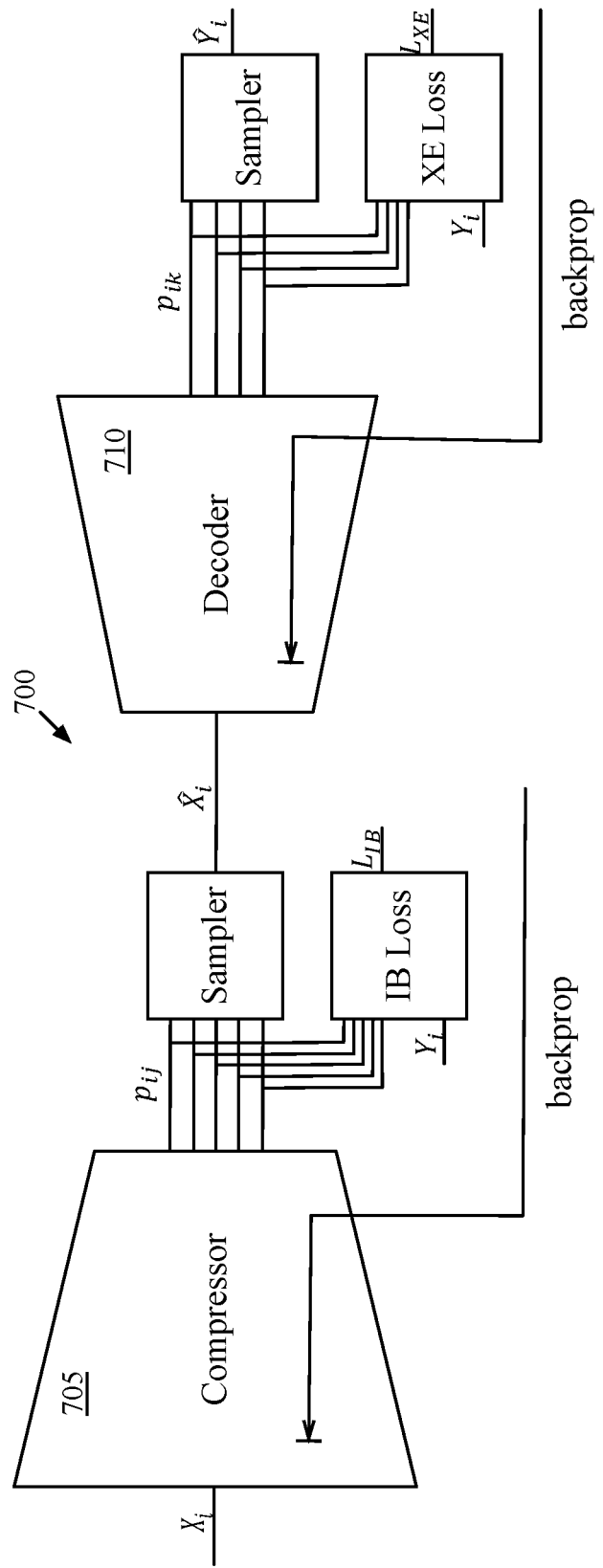
FIG. 7 conceptually illustrates the architecture of an information bottleneck neural network of some embodiments.

FIG. 7 conceptually illustrates the architecture of an TB neural network 700 of some embodiments. For each piece of input data $X_i$, the compressor stage 705 (which may include many layers) of the network computes $p_{ij}$, a probability distribution over the symbols in $\hat{X}$. The bottleneck allows a single symbol from $\hat{X}$ to pass between the stages. This symbol can be stochastically sampled from the distribution $p_{ij}$. The decoder stage 710 computes $p_{ik}$, a probability distribution over the categories in $\mathcal{Y}$. The hypothesis classification $\hat{Y}_i$ can be sampled from the distribution $p_{ik}$.

The TB loss function of some embodiments takes $p_{ij}$ and $Y_i$ as inputs, and backpropagates gradients through the compressor stage 705. The TB loss function does not provide gradients for training the decoder stage 7 in some embodiments. The goal is to make sure $\hat{X}_i$ includes the necessary information for decoding $Y_i$, without dictating a specific decoding technique. One approach is to use a second loss function term (e.g., cross-entropy loss, as shown in FIG. 7) to train the decoder stage to decode $Y_i$ from $\hat{X}_i$. As described below, some embodiments use an alternative approach in which the decoder stage is generated automatically instead of trained.

Figure 8:
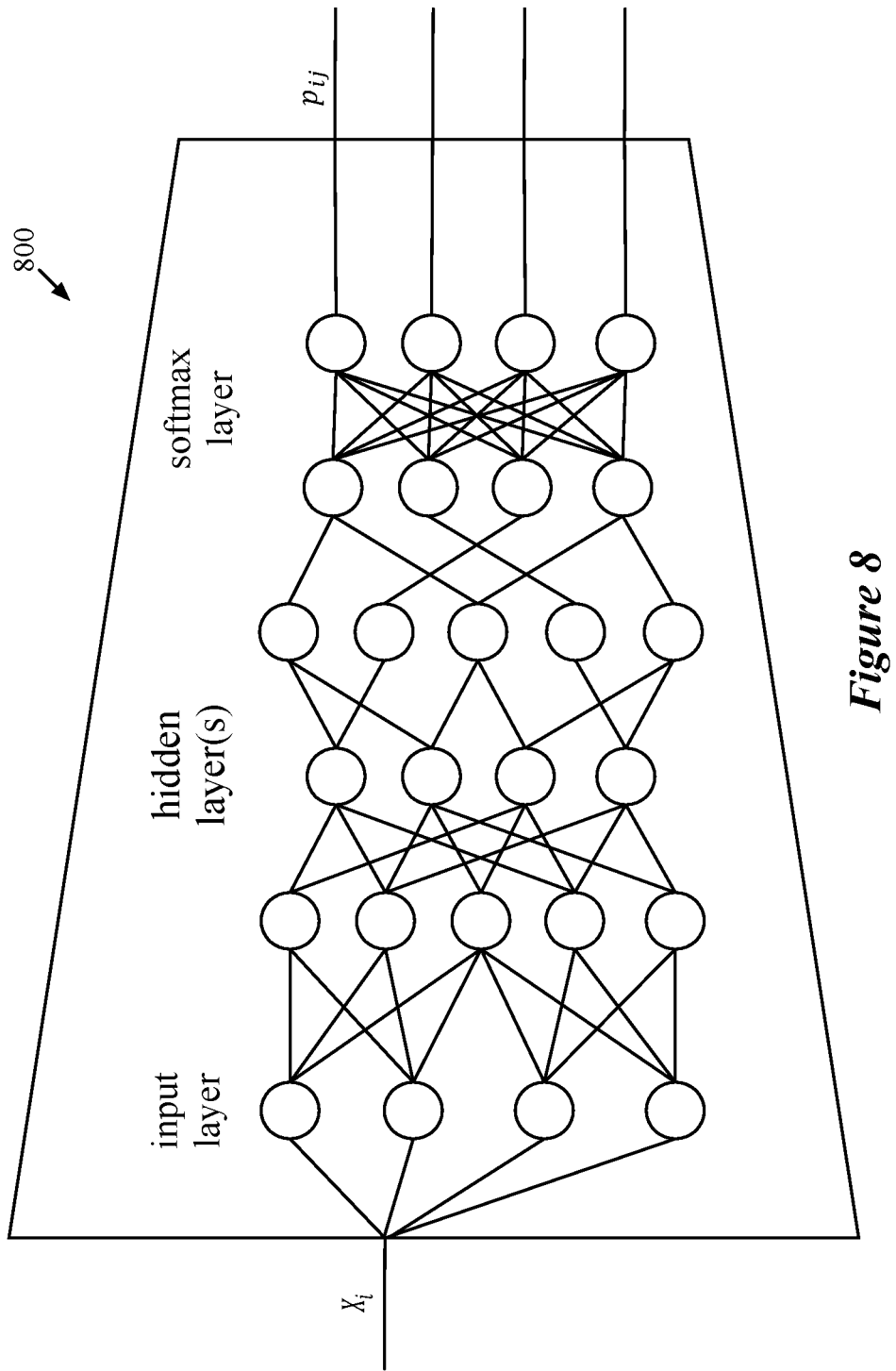
FIG. 8 conceptually illustrates a softmax compressor of some embodiments.

The compressor stage 705 has multiple possible designs for different embodiments. FIG. 8 conceptually illustrates a softmax compressor 800 of some embodiments. This softmax compressor is a neural network with one output neuron for each symbol in $\hat{X}$. The final layer in the network is a softmax layer which produces $p_{ij}$, the desired probability distribution function over the symbols in $\hat{X}$. This approach is similar to a traditional classifier network that learns a one-hot encoding of the categories. In this case, however, there are more symbols j ∈ $\hat{X}$ than there are categories j ∈ Y, such that H($\hat{X}$) may be greater than H(Y)

Some embodiments use a stochastic quantization compressor. This is a neural network with a scalar output that can only take a fixed discrete set of numeric values. Such a compressor might use full-precision floating point math internally and probabilistically snap the final output to a discrete value. The distribution $p_{ij}$ is obtained from the probabilities used within the snapping procedure.

Figure 9:
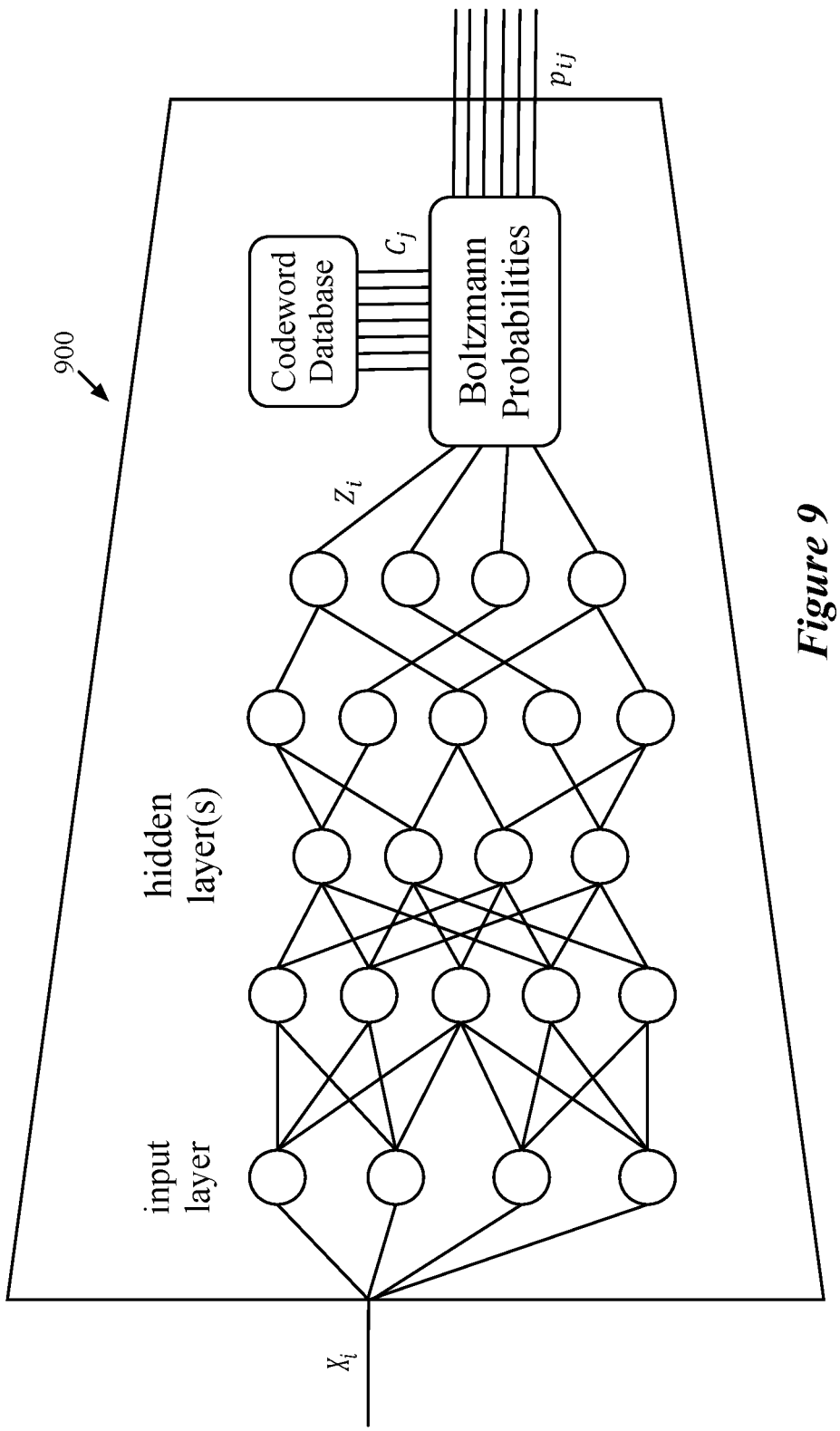
FIG. 9 conceptually illustrates a Boltzmann compressor of some embodiments.

FIG. 9 conceptually illustrates a third option, a Boltzmann compressor 900 of some embodiments. This type of compressor network produces a point $z_i$ in D-dimensional space for each input datum i, and computes $p_{ij}$ by measuring the Boltzmann probabilities of point $z_i$ belonging to various codewords $C_j$ in that same space. There is one codeword $C_j$ defined for each j ∈ X̂. This approach has the advantage that D can be much smaller than |X̂|, saving computation and memory. Because the vector components $z_{id}$ are floating point numbers, a high-entropy X̂ can be described in a low-dimensional space.

The following are several terms used in the subsequent description of a Boltzmann compressor of some embodiments:
- $z_i$: network output point in D-dimensional space for training datum i, with vector components $z_{id}$
- $C_j$: codeword for symbol j ∈ X̂, with vector components $C_{jd}$
- $d_{ij}$: squared Euclidean distance from $z_i$ to $C_j$
- $\lambda_j$: inverse squared radius of codeword $C_j$
- $\alpha$: user-specified global scaling factor
- $p_{ij}$: probability that point $z_i$ belongs to codeword $C_j$ The following equations are used to compute $p_{ij}$ (i.e., the probability that the point $z_i$ belongs to a given codeword $C_j$):

$$d_{ij} = \|z_i - C_j\|^2 = \sum_d (z_{id} - C_{jd})^2 \quad (12)$$

$$R_i = \max_j (-\alpha \lambda_j d_{ij}) \quad (13)$$

$$S_i = \sum_j e^{-\alpha \lambda_j d_{ij} - R_i} \quad (14)$$

$$p_{ij} = \frac{1}{S_i e^{\alpha \lambda_j d_{ij} - R_i}} \quad (15)$$

The product $\lambda_j d_{ij}$ provides the distance to codeword j in units of squared radii of codeword j. In addition, including a in this product enables control of the global scale of the system. The probability distribution $p_{ij}$ is a Boltzmann distribution with respect to these regularized distances. In addition, it should be noted that the Boltzmann distribution in equation (15) may also include a normalization term in some embodiments. To compute the probabilities, some embodiments first compute the partition function $S_i$ using the well-known technique of subtracting an offset $R_i$ from the exponents to ensure numerical stability with floating-point arithmetic. The parameters $C_j$, $\lambda_j$, and $\alpha$ may be fixed constants or learned parameters of the system in different embodiments.

The following equations give the gradients with respect to any of the parameters $$\xi \in \{\alpha, \lambda_j, C_{jd}, z_{id}\} : \frac{\partial p_{ij}}{\partial \xi} = \quad (16)$$

$$-p_{ij} \left( \frac{1}{S_i} \frac{\partial S_i}{\partial \xi} + \lambda_j d_{ij} \frac{\partial \alpha}{\partial \xi} + \alpha d_{ij} \frac{\partial \lambda_j}{\partial \xi} + \alpha \lambda_j \frac{\partial d_{ij}}{\partial \xi} \right)$$

$$\frac{1}{S_i} \frac{\partial S_i}{\partial \xi} = -\sum_j p_{ij} \left( \lambda_j d_{ij} \frac{\partial \alpha}{\partial \xi} + \alpha d_{ij} \frac{\partial \lambda_j}{\partial \xi} + \alpha \lambda_j \frac{\partial d_{ij}}{\partial \xi} \right) \quad (17)$$

$$\frac{\partial d_{ij}}{\partial \xi} = \begin{cases} 2(z_{id} - C_{jd}) : \xi = z_{id} \\ -2(z_{id} - C_{jd}) : \xi = C_{jd} \end{cases} \quad (18)$$

When $\xi = \alpha$:

$$\frac{\partial p_{ij}}{\partial \alpha} = \quad (19)$$

$$-p_{ij} \left( \frac{1}{S_i} \frac{\partial S_i}{\partial \alpha} + \lambda_j d_{ij} \frac{\partial \alpha}{\partial \alpha} + \alpha d_{ij} \frac{\partial \lambda_j}{\partial \alpha} + \alpha \lambda_j \frac{\partial d_{ij}}{\partial \alpha} \right) = -p_{ij} \left( \frac{1}{S_i} \frac{\partial S_i}{\partial \alpha} + \lambda_j d_{ij} \right)$$

$$\frac{1}{S_i} \frac{\partial S_i}{\partial \alpha} = -\sum_j p_{ij} \left( \lambda_j d_{ij} \frac{\partial \alpha}{\partial \alpha} + \alpha d_{ij} \frac{\partial \lambda_j}{\partial \alpha} + \alpha \lambda_j \frac{\partial d_{ij}}{\partial \alpha} \right) = -\sum_j p_{ij} \lambda_j d_{ij} \quad (20)$$

When $\xi = \lambda_j$:

$$\frac{\partial p_{ij}}{\partial \lambda_j} = \quad (21)$$

$$-p_{ij} \left( \frac{1}{S_i} \frac{\partial S_i}{\partial \lambda_j} + \lambda_j d_{ij} \frac{\partial \alpha}{\partial \lambda_j} + \alpha d_{ij} \frac{\partial \lambda_j}{\partial \lambda_j} + \alpha \lambda_j \frac{\partial d_{ij}}{\partial \lambda_j} \right) = -p_{ij} \left( \frac{1}{S_i} \frac{\partial S_i}{\partial \lambda_j} + \alpha d_{ij} \right)$$

$$\frac{1}{S_i} \frac{\partial S_i}{\partial \lambda_j} = -\sum_j p_{ij} \left( \lambda_j d_{ij} \frac{\partial \alpha}{\partial \lambda_j} + \alpha d_{ij} \frac{\partial \lambda_j}{\partial \lambda_j} + \alpha \lambda_j \frac{\partial d_{ij}}{\partial \lambda_j} \right) = -\sum_j p_{ij} \alpha d_{ij} \quad (22)$$

When $\xi = z_{id}$:

$$\frac{\partial p_{ij}}{\partial z_{id}} = -p_{ij} \left( \frac{1}{S_i} \frac{\partial S_i}{\partial z_{id}} + \lambda_j d_{ij} \frac{\partial \alpha}{\partial z_{id}} + \alpha d_{ij} \frac{\partial \lambda_j}{\partial z_{id}} + \alpha \lambda_j \frac{\partial d_{ij}}{\partial z_{id}} \right) = \quad (23)$$

$$-p_{ij} \left( \frac{1}{S_i} \frac{\partial S_i}{\partial z_{id}} + \alpha \lambda_j \frac{\partial d_{ij}}{\partial z_{id}} \right)$$

$$\frac{1}{S_i} \frac{\partial S_i}{\partial z_{id}} = \quad (24)$$

$$-\sum_j p_{ij} \left( \lambda_j d_{ij} \frac{\partial \alpha}{\partial z_{id}} + \alpha d_{ij} \frac{\partial \lambda_j}{\partial z_{id}} + \alpha \lambda_j \frac{\partial d_{ij}}{\partial z_{id}} \right) = -\sum_j p_{ij} \alpha \lambda_j \frac{\partial d_{ij}}{\partial z_{id}}$$

$$\frac{\partial d_{ij}}{\partial z_{id}} = 2(z_{id} - C_{jd}) \quad (25)$$

Lastly, when $\xi = C_{jd}$:

$$\frac{\partial p_{ij}}{\partial C_{jd}} = -p_{ij} \left( \frac{1}{S_i} \frac{\partial S_i}{\partial C_{jd}} + \lambda_j d_{ij} \frac{\partial \alpha}{\partial C_{jd}} + \alpha d_{ij} \frac{\partial \lambda_j}{\partial C_{jd}} + \alpha \lambda_j \frac{\partial d_{ij}}{\partial C_{jd}} \right) = \quad (26)$$

$$-p_{ij} \left( \frac{1}{S_i} \frac{\partial S_i}{\partial C_{jd}} + \alpha \lambda_j \frac{\partial d_{ij}}{\partial C_{jd}} \right)$$

$$\frac{1}{S_i} \frac{\partial S_i}{\partial C_{jd}} = \quad (27)$$

$$-\sum_j p_{ij} \left( \lambda_j d_{ij} \frac{\partial \alpha}{\partial C_{jd}} + \alpha d_{ij} \frac{\partial \lambda_j}{\partial C_{jd}} + \alpha \lambda_j \frac{\partial d_{ij}}{\partial C_{jd}} \right) = -\sum_j p_{ij} \alpha \lambda_j \frac{\partial d_{ij}}{\partial C_{jd}}$$

$$\frac{\partial d_{ij}}{\partial C_{jd}} = -2(z_{id} - C_{jd}) \quad (28)$$

Applying the chain rule to the information bottleneck loss function results in:

$$\frac{\partial L_{IB}}{\partial \xi} = \sum_i \sum_j \frac{\partial L_{IB}}{\partial p_{ij}} \frac{\partial p_{ij}}{\partial \xi} \quad (29)$$

For the decoder stage of the network of some embodiments, some embodiments use a neural network trained with standard techniques (or using hyperparameter tuning as described herein) to produce Y from X̂. Such a decoder could be a standard classifier neural network in some embodiments, that solves the sub-problem of classifying the compressed input data X̂. If the information bottleneck loss function successfully discards noise while preserving important information, then this sub-problem should be easier and less prone to overfitting than the original problem of classifying X. One option is to use the standard cross-entropy loss function to train the decoder network to produce $p_{ik}$, a one-hot encoding of the category Y.

A second option for the decoder stage of some embodiments is to use an automatically generated decoder that leverages data structures from within the information bottleneck loss function. Such a decoder reuses the $\delta_{kj}$ values computed for the information bottleneck loss term I(X̂; Y) to automatically generate a decoder from X̂ to Y. The $\delta_{kj}$ matrix entries are defined to be $\delta_{kj} = \Pr\{X̂=j|Y=k\}$. Reversing this conditional probability using Bayes' Theorem gives $\delta_{jk}=\Pr\{Y=k|\hat{X}=j\}$. This result is the desired probability distribution $p_{ik}$ given $\hat{X}_i=j$. The $\delta_{jk}$ matrix can be computed once at the end of training, and the decoder stage is simply a lookup table that outputs a $p_{ik}$ vector for each symbol in $\hat{X}$.

VIB builds on the information bottleneck concept by introducing a variational bound of the information bottleneck loss function. In some embodiments, VIB moves layer-by-layer to identify portions of the network (e.g., nodes, edges, or even entire filters) that are not passing important information. To accomplish this, in some embodiments, VIB introduces probabilistic (e.g., Gaussian) noise into the output values of a set of computation nodes of the network (e.g., the nodes of one or more layers of the network). That is, the outputs of such nodes (which are passed to nodes in the next layer) are made to vary probabilistically around the actual computed output value during training. This noise enables the training system to identify nodes that are less important to the eventual output of the network (e.g., the classification decision, etc.) and remove these nodes. That is, if the introduction of noise to a particular node does not have a noticeable effect on the network output, then this node can be removed. Different embodiments may use this technique to remove individual nodes, edges (i.e., the passing of values from one node to another), and even entire filters (effectively a group of computation nodes).

Figure 10:
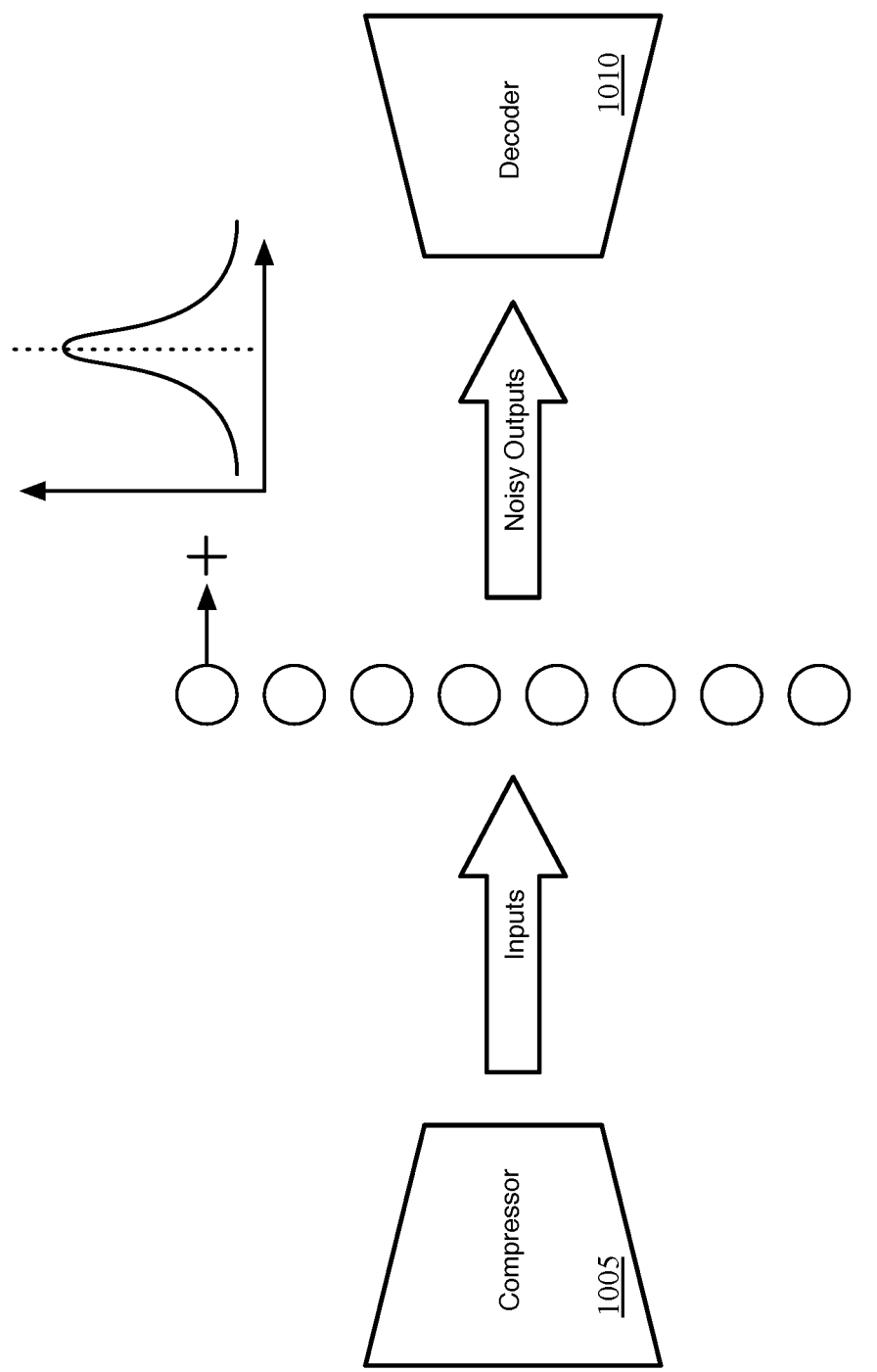
FIG. 10 conceptually illustrates the introduction of noise for a single bottleneck layer of computation nodes.

FIG. 10 conceptually illustrates this concept for a single bottleneck layer 1000 of computation nodes. In this case, the compressor 1005 and decoder 1010 are simply the layers of the neural network leading up to the bottleneck layer 1000. In some embodiments, each layer of the network is treated as a bottleneck for the purpose of identifying the nodes, edges, and/or filters that can be removed from the network. As shown in this figure, each of the nodes in the bottleneck layer 1000 has noise added to its output (e.g., with this noise based on a probability distribution about the actual output value). These noisy outputs are provided to the decoder 1010 in order to determine which outputs can be removed from the network.

Thus, the goal of training with VIB is to reduce the information transmitted by nodes, edges, and/or filters to the point that they can be removed from the network. To accomplish this goal, some embodiments use a VIB loss term for a layer that is an estimate of the total information transmitted by that layer (the VIB loss function being different than the standard information bottleneck loss described above, due to the variational bound being introduced). One such possible loss function is the following:

$$l_{VIB} = \gamma \sum_c \log\left(1 + \frac{1}{\sigma_c^2}\right) \quad (28)$$

This loss function, in some embodiments, represents the loss for a single layer, with the subscript c representing each channel output by the layer (e.g., the outputs for each filter of the layer). The complete loss function, then is a sum over all of the layers, with a different $\gamma$ and $\sigma_c$ for each layer. The $\sigma_c$ represents the noise variance for the channel, while the coefficient $\gamma$ is a multiplicative variable that can be changed per layer. That is, this coefficient value is a hyperparameter that can be modified by the techniques described herein.

The gradient of this VIB loss term $l_{VIB}$ for a single layer is:

$$\frac{\partial l_{VIB}}{\partial \sigma_c} \approx -\frac{2\gamma}{\sigma_c(\sigma_c^2 + 1)} \quad (29)$$

For large $\sigma_c$, this gradient falls off rapidly, as $1/\delta_c^3$:

$$\frac{\partial l_{VIB}}{\partial \sigma_c} \approx -\frac{2\gamma}{\sigma_c^3} \quad (30)$$

The result of this gradient is that the VIB loss function pushes harder to increase noise on a channel with small noise variance than on a channel with a large noise variance (e.g., a channel that is on the threshold of being pruned). Some embodiments instead use a heuristic loss function term $l_{VIB}^{(heur)}$ that removes the additive constant 1 from the logarithm in the per-channel VIB loss term:

$$l_{VIB}^{(heur)} = -\gamma \sum_c \log(\sigma_c^2) \quad (31)$$

The gradient of this heuristic VIB loss term for a single layer is:

$$\frac{\partial l_{VIB}^{(heur)}}{\partial \sigma_c} = -\frac{2\gamma}{\sigma_c} \quad (32)$$

The removal of the additive constant causes the gradient to fall off much more gradually with increasing noise variance (i.e., as proportional to $\sigma_c$ rather than $\sigma_c^3$. When the noise is small, the difference between the gradients of these two loss functions is minimal, but when the noise is large, the gradient of the heuristic loss function increases the likelihood of channel removal as compared to the gradient for the initial loss function given above.

As noted above, the goal of using VIB techniques in training is to reduce the information transmitted by channels so that those channels can be removed from the network. In some embodiments, a channel can be removed once its noise variance ($\sigma_c$) exceeds a threshold (e.g., 1). However, the VIB loss terms shown above (both the initial and heuristic loss terms) do not take into account this threshold and, as noted, push harder to increase the noise for low-noise channels than for channels that are near the removal threshold. Therefore, some embodiments use a loss function that explicitly penalizes the number of remaining channels, such as the following:

$$l_{VIB}^{(chan)} = \gamma \sum_c \text{Sigmoid}(1 - \sigma_c) \quad (33)$$

This sigmoid function is a smooth approximation to the number of remaining channels, with the sigmoid being a continuous function and therefore having a finite gradient (as opposed to a step function). Using this approach, the VIB coefficient $\gamma$ can be viewed as a Lagrange multiplier for a constraint on the number of channels that remain for each layer. This coefficient is a hyperparameter that can be tuned using the techniques described herein in order to determine the limit for each different layer of the network that yields a minimum validation loss (as opposed to mandating a specific limit on the number of channels for each layer).

The use of a sigmoid function ensures that the gradient force exerted to increase the noise on a channel is at a maximum when that channel is near the removal threshold. Various sigmoid functions may be used for the loss function: these include the logistic function, an algebraic sigmoid function, and a Cauchy cumulative distribution function (CDF). The logistic function, logistic(x)=1/(1+e$^{-x}$), has a gradient that decays rapidly with increasing |x|, and thus is not an optimal choice.

The algebraic sigmoid is given by the following equation (where v is the width of the sigmoid):

$$\text{Sigmoid}(x) = \frac{1}{2}\left[1 + \frac{(x/v)}{\sqrt{1 + (x/v)^2}}\right] \quad (34)$$

The derivative of this function is given by:

$$\frac{\partial \text{Sigmoid}(x)}{\partial x} = \frac{1}{2v[1 + (x/v)^2]^{3/2}} \quad (35)$$

Thus, the VIB single-layer loss term gradient with respect to the noise variance using an algebraic sigmoid is:

$$\frac{\partial l_{VIB}^{(chan)}}{\partial \sigma_c} = -\frac{\gamma}{2v\{[(\sigma_c - 1)/v]^2 + 1\}^{\frac{3}{2}}} \quad (36)$$

For large values of $\sigma_c$, this approximates to:

$$\frac{\partial l_{VIB}^{(chan)}}{\partial \sigma_c} \approx -\frac{\gamma v}{2\sigma_c^3} \quad (37)$$

Another type of sigmoid function is generated by starting with a bell-shaped probability distribution function (PDF) centered at zero, and then taking the CDF of this PDF as the sigmoid (this CDF has a value of 0 at negative infinity and 1 at positive infinity, as required for a sigmoid function). The derivative of the sigmoid is thus the original bell-shaped PDF. Thus, some embodiments use a PDF that falls off slowly with increasing |x|, then the resulting sigmoid will have a derivative with this same property. The Cauchy PDF falls off just about as slowly as possible for a PDF with support on the entire real axis, so its CDF is useful as a sigmoid function. This Cauchy CDF is given by:

$$\text{Sigmoid}(x) = 1/\pi \arctan(x/v) + 1/2 \quad (38)$$

The derivative of this sigmoid is, as mentioned, the Cauchy PDF, which falls off with increasing |x| as $1/|x|^2$:

$$\frac{\partial \text{Sigmoid}(x)}{\partial x} = \frac{1}{\pi v\left[1 + \left(\frac{x}{v}\right)^2\right]} \quad (39)$$

Using this formulation for the VIB loss term, the gradient with respect to the noise variance is:

$$\frac{\partial l_{VIB}^{(chan)}}{\partial \sigma_c} = -\frac{\gamma}{\pi v\left[1 + \left(\frac{\sigma_c - 1}{v}\right)^2\right]} \quad (40)$$

For large values of $\sigma_c$, this approximates to:

$$\frac{\partial l_{VIB}^{(chan)}}{\partial \sigma_c} \approx -\frac{\gamma v}{\pi \sigma_c^2}. \quad (41)$$

As noted, the coefficient γ for each layer of the network can be treated as a different hyperparameter, and as such the training of a network using VIB will include many different hyperparameters (i.e., one for each layer, in addition to the learning rate, regularization parameters, etc.). Attempting to manually tune these hyperparameters is difficult and inaccurate even when there are only a few such values (i.e., without VIB), but when using VIB for training this problem becomes dramatically more difficult. As such, some embodiments tune the hyperparameters, including the VIB coefficients, using the prequential techniques described herein.

Several examples of hyperparameter tuning will now be described, again using the sender/receiver formulation. A first example relates to tuning a parameter a that multiplies the Kullback-Leibler (KL) term (a measure of the divergence between prior and current posterior probability distributions) in a Variational Bayes (VB) loss function. As mentioned above, VB is described in more detail in U.S. patent application Ser. No. 15/921,622 (filed Mar. 14, 2018). The VB loss function is given as $$\text{Loss}_{VB} = \text{Likelihood} - \alpha^*(\text{KL}). \quad (42)$$

As described above, the assumption is made that the sender has complete input and output data, while the receiver initially only has the input data. Both sender and receiver order the inputs in the same manner, and have the same initial network (in the VB formulation, the natural parameters η for the initial posterior of each weight are the same for the sender and receiver, and are initially random). In addition, some embodiments make a simplifying assumption that each input is processed exactly once during a training run. To begin with this calculation, the description length score is initially set to zero, and as an initial group of inputs is provided to the receiver its bit cost is added to this score.

Using the initial α, the sender and receiver take one gradient step for each input in the minibatch in some embodiments (though, as described below, other embodiments use different optimization techniques rather than using these gradient steps). The VB gradient for a given input i is $$g_i = \frac{\partial (\text{Loss}_{VB,i})}{\partial \eta} = \frac{\partial (\text{Likelihood}_i)}{\partial \eta} - \alpha \frac{\partial (KL)}{\partial \eta}. \quad (43)$$

Here, the gradient of KL does not depend on the input index i. After a training run m of $n_m$ inputs, with input numbers $i_{m,1}, \ldots i_{m,n\_m}$ is processed, the new parameter value (using learning rate $\lambda$) is $$\eta_{new} = \eta + \Delta\eta = \eta + \lambda\sum_{i=1}^{m} g_i = \eta + \sum_{i=1}^{m} \frac{\partial(\text{Likelihood}_i)}{\partial\eta} - \alpha\lambda m\frac{\partial(KL)}{\partial\eta}. \quad (44)$$

For the purpose of determining the optimal change in a, as indicated above, some embodiments look at the error bits for the subsequent (i.e., out of sample) group of inputs for training run m+1, because to use the error bits for the current set of inputs would encourage $\alpha=0$ so that the gradient would focus on in-sample fitting only. The goal, as described above, is to choose a in order to minimize the error bits required to provide this next set of inputs m+1 to the receiver. To do so, some embodiments compute the gradient of these error bits with respect to a using backpropagation using the following:

$$\frac{\partial(ErrorBits)}{\partial\alpha} = \frac{\partial(ErrorBits)}{\partial\eta} \cdot \frac{\partial\eta}{\partial\alpha}, \quad (45)$$

where the right-hand side is the dot product of (i) the gradient of the error bits with respect to the natural parameter vector and (ii) the derivative of the natural parameter vector with respect to a. This last term reflects the impact of $\alpha$ on the updates to the natural parameters performed using the current set of inputs. Therefore, this is evaluated at $\eta_{new}$, viewed as a function of a as computed from the group of inputs m, such that the gradient of the error bits with respect to a becomes $$\frac{\partial(ErrorBits)}{\partial\alpha} = \frac{\partial(ErrorBits)}{\partial\eta}\Big|_{\eta=\eta_{new}} \frac{\partial(\eta_{new})}{\partial\alpha} \quad (46)$$

$$= \frac{\partial(ErrorBits)}{\partial\eta}\Big|_{\eta=\eta_{new}} \frac{\partial}{\partial\alpha}\left(\eta + \lambda\sum_{i=1}^{m}\frac{\partial(\text{Likelihood}_i)}{\partial\eta} - \alpha\lambda m\frac{\partial(KL)}{\partial\eta}\right)$$

$$= -\lambda m\left(\frac{\partial(KL)}{\partial\eta}\right)\frac{\partial(ErrorBits)}{\partial\eta}\Big|_{\eta=\eta_{new}}$$

It should be noted that $\partial(KL)/\theta_\eta$ may be computed analytically, while $\partial(ErrorBits)/\partial_\eta$ is obtained from forward propagation and then subsequent backpropagation (of the total error bits for sending group of inputs m+1) with respect to $\eta$. Some embodiments apply the learning rate $\lambda_\alpha$ to the gradient of error bits with respect to $\alpha$ and define the new value for $\alpha$ as $$\alpha_{new} = \quad (47)$$
$$\alpha + \Delta\alpha = \alpha + \lambda_\alpha\frac{\partial(ErrorBits)}{\partial\alpha} = \alpha - \lambda_\alpha\left(\frac{\partial(KL)}{\partial\eta}\right)\frac{\partial(ErrorBits)}{\partial\eta}\Big|_{\eta=\eta_{new}}.$$

This updated hyperparameter value $\alpha_{new}$ is provided to the receiver and the bit cost for this update (e.g., the bit cost of the change in hyperparameter value) is added to the description length score. From this point in the computation, two algorithms are possible in different embodiments for updating $\alpha$. The difference between a basic a update and an accelerated approximate $\alpha$ update involves the error bits to be added to the description length score for the new group of inputs m+1. The basic update uses the current model $\eta_{new}$ that was found using the previous $\alpha$, while the accelerated method uses a first-order approximation to the consequences of using the model $\eta^*_{new}$ that would have been found using $\alpha_{new}$ with the group of inputs m, thereby generating a smaller description length score (due to the improved $\alpha$) without the additional computation of propagating the group of inputs m+1 again to find the exact error bits and updating the model retroactively.

For the basic alpha update, some embodiments take the already-computed error bits for the group of inputs m+1 with respect to the model $\eta_{new}$ and add these error bits to the description length score. Both sender and receiver then use $\alpha_{new}$ in place of a, model $\eta_{new}$ in place of model $\eta$, and groups of inputs m+1 in place of m, and recurse the gradient calculation.

As mentioned, for the accelerated update, some embodiments reduce the error bits added to the score by using a first-order approximation to these error bits that would have been obtained using the model $\eta_{new}$ that would have been found using anew in place of $\alpha$ in the VB gradient step that defined $\eta_{new}$. To determine $\eta_{new}$, some embodiments modify $\eta^{new}$ to approximate what its value would have been if using anew in place of a in the VB training of the previous group of inputs m. First, it is noted that $$\eta_{new} = \eta + \lambda\sum_{i=1}^{m}\frac{\partial(\text{Likelihood}_i)}{\partial\eta} - \alpha\lambda m\frac{\partial(KL)}{\partial\eta} \quad (48)$$

$$= \eta + \lambda\sum_{i=1}^{m}\frac{\partial(\text{Likelihood}_i)}{\partial\eta} - [\alpha_{new} - (\alpha_{new} - \alpha)]\lambda m\frac{\partial(KL)}{\partial\eta}$$

$$= \eta + \lambda\sum_{i=1}^{m}\frac{\partial(\text{Likelihood}_i)}{\partial\eta} - \alpha_{new}\lambda m\frac{\partial(KL)}{\partial\eta} + (\Delta\alpha)\lambda m\frac{\partial(KL)}{\partial\eta},$$

where $\Delta\alpha = \alpha_{new} - \alpha$. Using $\alpha_{new}$ would have resulted in $$\eta^*_{new} = \quad (49)$$
$$\eta + \lambda\sum_{i=1}^{m}\frac{\partial(\text{Likelihood}_i)}{\partial\eta} - \alpha_{new}\lambda m\frac{\partial(KL)}{\partial\eta} = \eta_{new} - (\Delta\alpha)\lambda m\frac{\partial(KL)}{\partial\eta}.$$

Next, the approximate error bits that would have been computed for the group of inputs m+1 with model $\eta_{new}$ is determined. This approximation is available using the previously-computed gradient $\partial(ErrorBits)/\partial\alpha$. Thus, the error bits as computed using the basic update technique are modified for the accelerated method using the following equation $$AcceleratedErrorBits = ErrorBits + (\alpha_{new} - \alpha)\frac{\partial(ErrorBits)}{\partial\alpha}. \quad (40)$$

These accelerated error bits represent a quick approximation to the error bits that would have been computed to send the group of inputs m+1 using m+1 using 11*new without performing an additional forward propagation. These approximate accelerated error bits are added to the description length core. Both the sender and receiver can now use $\alpha_{new}$ in place of a, model $\eta^*_{new}$ in place of model and the group of inputs m+1 in place of m, and recurse the gradient calculation.

The approximate accelerated method of some embodiments involves two improvements as compared to the basic method. First, the model size is smaller, representing an improved estimate of the description length of the VB method. Second, there are two opportunities used to improve the model—both the basic VB gradient step and the improvement on the previous model had the new a been used earlier. That is, the new α is used retroactively for the previous group of training inputs, while being careful to not perform in-sample VB optimization. Because this retroactive model improvement can be calculated based on information already accounted for in the description length score, there is no additional bit cost for the improvement.

A second example relates to the hyperparameter vector $\lambda$ of length len($\lambda$) that appears in the (receiver's) loss function as $$L_{Receiver} = L_1 + L_2 \cdot \lambda, \quad (51)$$

where $\lambda$ might represent a vector of information bottleneck (TB) parameters. In some embodiments, Equation (51) is interpreted as a scalar loss function $L_1$ (e.g., unhappiness) together with the dot product of a vector $L_2$ of regularization functions with a vector A of hyperparameters (each entry of which is controlling the effect of the corresponding regularization). For example, a different IB parameter might be used for each level of the network. The receiver uses the current value $\lambda_0$ of $\lambda$ to produce new weights $w=w(\lambda_0)$.

The sender, in some embodiments, attempts to choose a modified vector $\lambda=\lambda_0+\Delta\lambda$ of hyperparameters to minimize the hyperparameter optimization loss function, which as described above includes hyperparameter modification bits as well as error bits for new training inputs T, prorated to the size of a minibatch M (noting that T might be the same size as M). This loss function for hyperparameter optimization (also referred to as the sender's loss function) can be expressed as $$L_{Sender}(\lambda) = \text{BitsOf}(\lambda-\lambda_0) + |M| \cdot \text{ErrorBitsPerItemOfT}(\lambda). \quad (52)$$

Alternatively, some embodiments use BitsOf[$(\lambda-\lambda_0)/\lambda_0$] in this loss function if sending multiplicative adjustments, in place of BitsOf $(\lambda-\lambda_0)$.

To choose the optimized modified hyperparameter vector, the sender needs both the gradient $\partial L_{sender}(\lambda)/\partial\lambda$ and a step size. In some embodiments, the gradient of the BitsOf($\lambda-\lambda_0$) in Equation (52) can be computed in a straightforward manner once a bit representation is chosen for the scalar components of $\Delta\lambda=\lambda-\lambda_0$ and these bit representations are added up.

To find the gradient of the error bits per item of T from Equation (52) with respect to $\lambda$, in some embodiments the sender anticipates the optimization the receiver would have done had $\lambda=\lambda_0+\Delta\lambda$ been used in place of $\lambda_0$, then use the resulting $w(\lambda)$, in place of $w(\lambda_0)$, to predict the items of T. To find this gradient, some embodiments use the chain rule $$\frac{\partial ErrorBitsPerItemOfT(\lambda)}{\partial \lambda} = \frac{\partial ErrorBitsPerItemOfT}{\partial w} \cdot \frac{\partial w(\lambda)}{\partial \lambda} \quad (53)$$

The left-hand side of this Equation (53) is a row vector of length len($\lambda$), while the right-hand side is a vector-matrix product where the first term is a row vector of dimension len(w), while the second term is a matrix of dimension len(w)×len($\lambda$). It should be noted that some embodiments work with the transpose of Equation (53) instead. The first term on the right in this equation involves one back-propagation of ErrorBits for each item of T, then weighted for unbiasedness to adjust for the sample of inputs. This evaluates the sender's out-of-sample-error-bit-gradient with respect to w at the receiver's ending weights w computed using $\lambda_0$.

The second term on the right in Equation (53) is approximated to first-order in $\Delta\lambda$, anticipating the training system behavior with this slightly different $\lambda$. For this approximation, it is noted that the transformation $w_0 \rightarrow w(\lambda_0)$ consists of accumulated steps (scaled by the receiver's LearningRate) in the direction of the receiver's gradient using the following equation $$\frac{\partial L_{Receiver}}{\partial w} = \frac{\partial L_1}{\partial w} + \frac{\partial L_2}{\partial w} \cdot \lambda_0, \quad (54)$$

where $\partial L_2/\partial w$ is interpreted as a matrix of size len(w)×len($\lambda$) so that its product with $\lambda_0$ produces a column vector of size len(w) to match dimensions of $\partial L_1/\partial w$. To anticipate (to first order) the $w(\lambda)$ that the receiver would have obtained by using A in place of $\lambda_0$, some embodiments use steps (of size LearningRate) of the gradient $$\frac{\partial L_1}{\partial w} + \frac{\partial L_2}{\partial w} \cdot \lambda. \quad (55)$$

To obtain a first-order approximation, the scaled sums of these basic components $\partial L_1/\partial w$ and $\partial L_2/\partial w$ are accumulated. These accumulated scaled sums may be denoted as $$A_1 = LearningRate \sum \frac{\partial L_1}{\partial w} \quad (56)$$

and $$A_2 = LearningRate \sum \frac{\partial L_2}{\partial w}, \quad (57)$$

where the sum is over the receiver's optimization steps. $A_2$ is a matrix of size len(w)×len($\lambda$). Thus, the approximation to $w(\lambda)$ can be written in terms of the two components from Equations (56) and (57), $$w(\lambda) = A_1 + A_2 \cdot \lambda, \quad (58)$$

which represents the weights the receiver would have obtained if $\lambda$ had been used in place of $\lambda_0$. This construction also gives $$w(\lambda_0) = A_1 + A_2 \cdot \lambda_0. \quad (59)$$

Thus, the sender's gradient, with respect to $\lambda$, of the anticipated receiver's weights $w(\lambda)$ can be written as $$\frac{\partial w(\lambda)}{\partial \lambda} = A_2. \quad (60)$$

This Equation (60) is the final term on the right side of Equation (53) needed to compute the sender's gradient of error bits with respect to the hyperparameter vector λ. The sender's gradient is therefore $$\frac{\partial L_{Sender}}{\partial \lambda} = \frac{\partial BitsOf(\lambda - \lambda_0)}{\partial \lambda} + |M| \cdot \frac{\partial ErrorBitsPerItemOfT}{\partial w} \cdot A_2. \quad (61)$$

The sender takes a step in the direction of this gradient $\partial L_{Sender}$ ax of size Step from which the following equations $$\Delta \lambda = Step \frac{\partial L_{Sender}}{\partial \lambda} \quad (62)$$

and $$\lambda = \lambda_0 + \Delta\lambda \quad (63)$$

are obtained. These are both vectors of size len(λ).

To set the sender's step size, some embodiments use a nonlinear approximation to $L_{Sender}$ that is an improvement upon the first-order gradient (which contains no information about the optimal step size) although at a cost of additional computation. The sender's loss function for Δλ may be approximated Equation (52), $$L_{Sender} = BitsOf(\lambda-\lambda_0) + |M| \cdot \partial ErrorBitsPerItemOfT(\lambda). \quad (64)$$

In this equation, the error bits of the right-hand term may be obtained in some embodiments by a forward propagation of the elements of T through a network with weights w(λ)=w (λ₀+Δλ) as defined in Equation (58). Although a linear approximation to the weights is used, the actual out-of-sample error bits are computed; this combined with the cost of transmitting Δλ helps provide regularization to the choice of Step in some embodiments.

The algorithm for training this set of hyperparameters (e.g., the vector of TB parameters) is now discussed. Initially, the receiver trains to convergence (with the weights changing from $w_0$ to w) on S (the training set of "seen" inputs, including the most recent set of inputs added to the training set) by taking gradient steps in w (network weight) space to improve the receiver's loss function (i.e., the loss function for the network) using the current hyperparameter vector $\lambda_0$ and keeping track of $A_1$ and $A_2$ per Equations (56) and (57) (noting again that $L_1$ is the receiver's scalar loss function (e.g., unhappiness) and $L_2$ is a vector of len(λ) regularization functions.

The sender selects a stratified set of new inputs T from U (the validation set of "unseen" data instances), and attempts to identify a new value λ=λ₀+Δλ to replace λ₀. The sender performs one backpropagation (using the receiver's ending weights we computed using λ₀) of ErrorBits for each of the inputs in T, then weighted for unbiasedness to adjust for the stratified sample. This evaluates the sender's out-of-sample-error-bit-gradient (∂ErrorBitsPerItemOfT)/∂w with respect to w. The sender's gradient (where |M| is the minibatch size, which may be equal to T) is then given by Equation (61) above. The sender's new λ=λ₀+Δλ is obtained using step size Step as using Equation (62). If the sender chooses to evaluate this finite step size at a particular choice of λ, the sender's loss function can be approximated according to Equation (64), with the error bits of the right hand term being obtained by forward propagation of the elements of T through a network with weights w(λ)=A₁+A₂·λ. The sender then communicates the errors of the new set of training inputs along with a new λ, and the description length score is updated with the error bits plus the hyperparameter modification bits (i.e., the bits of Δλ).

As in the previous example, different embodiments use a basic update or an accelerated update. In the basic update, the receiver begins a new training run starting with w (the ending weights from the previous training run) as the new $w_0$, and with A as the new $\lambda_0$. In the accelerated version, the receiver begins a new training run starting with w(λ) (the sender's approximation to what the receiver would have ended up with had λ been used in place of $\lambda_0$ ending weights from the previous training) as the new $w_0$, and with λ as the new $\lambda_0$. As mentioned above, the receiver has full access to this information without violating the principle that the receiver cannot use validation inputs for training, because the receiver now has A along with the accumulated values of $A_1$ and $A_2$ from the (now) previous training. This accelerated update supposes that the new λ is better than the old $\lambda_0$ in the sense that it is closer to the stable limit, and that using the improved values sooner will help.

Finally, a third hyperparameter will be discussed, in this case η, the receiver's LearningRate (i.e., the learning rate used during training). The learning rate, unlike the above example, is not a feature of the receiver's loss function, but rather specifies how much the receiver modifies the weights during training (based on the receiver's loss function). The current training run uses the current learning rate $n_0$, beginning with weights $w_0$ and ending with weights $w(\eta_0)$ computed as the scaled gradient steps $$w(\eta_0) = \eta_0 \sum \frac{\partial L_{Receiver}}{\partial w}. \quad (65)$$

The sender's first-order approximation to the weights the receiver would have ended up with (had a different learning rate η been used) is then given by $$w(\eta) = \eta \sum \frac{\partial L_{Receiver}}{\partial w}. \quad (66)$$

The sender's loss function is given (similar to the above example) by $$L_{Sender}(\eta) = BitsOf(\eta-n_0) + |M|ErrorBitsPerItemOfT(\eta). \quad (67)$$

To find the gradient of the error bits per item of T from Equation (67) with respect to η, the sender anticipates the optimization the receiver would have done had $\eta=\eta_0+\Delta\eta$ been used in place of $\eta_0$, then use the resulting w(η) in place of $w(\eta_0)$, to predict the items of T. Using the chain rule, this gradient is given as $$\frac{\partial ErrorBitsPerItemOfT(\eta)}{\partial \eta} = \frac{\partial ErrorBitsPerItemOfT}{\partial w} \cdot \frac{\partial w(\eta)}{\partial \eta} \quad (68)$$

The left-hand side of this equation is a scalar, while the right-hand side is a dot product of two vectors each with dimension len(w). The first term on the right side of the equation involves one back-propagation of ErrorBits for each item of T, then weighted for unbiasedness to adjust for the stratified sample. This evaluates the sender's out-of-sample-error-bit-gradient with respect to w at the receiver's ending weights w computed using $\eta_0$. The second term on the right side of the equation is approximated to first-order in $\Delta\eta$ anticipating the receiver's behavior with this slightly different $\eta$, using Equation (66) to get $$\frac{\partial w(\eta)}{\partial \eta} = \sum \frac{\partial L_{Receiver}}{\partial w}. \quad (69)$$

Thus, the sender's gradient is $$\frac{\partial L_{Sender}}{\partial \eta} = \quad (70)$$

$$\frac{\partial BitsOf(\eta-\eta_0)}{\partial \eta} + |M| \cdot \frac{ErrorBitsPerItemOfT}{\partial w} \cdot \sum \frac{\partial L_{Receiver}}{\partial w}.$$

The sender takes a step in the direction of this gradient $\partial L_{Sender}/\partial\eta$ of size Step from which $$\Delta\eta = Step \frac{\partial L_{Sender}}{\partial \eta} \quad (71)$$

and $$\eta = \eta_0 + \Delta\eta \quad (72)$$

are obtained.

To set the sender's step size, some embodiments use a nonlinear approximation to $L_{Sender}$ as an improvement upon the first-order gradient (which does not have any information about the optimal step size), though at a cost of additional computation. The sender's loss function for $\Delta\eta$ may be approximated using Equation (67) as $$L_{Sender}(\eta) = BitsOf(\eta-\eta_0) + |M|ErrorBitsPerItemOfT(\eta). \quad (73)$$

in which the error bits of the right-hand term may be obtained by a forward propagation of the elements of T through a network with weights $w(\eta) = w(\eta_0, +\Delta\eta)$ as defined by Equation (66). Although some embodiments use a linear approximation to the weights, the actual out-of-sample error bits are computed; this combined with the cost of transmitting $\Delta\eta$ helps provide regularization to the choice of Step.

It should be noted that some embodiments use different techniques for hyperparameter tuning than the above examples (e.g., different techniques for computing the gradient, techniques to replace the gradient computations). For example, some embodiments use Bayesian optimization and hyperband (BOHB) for the hyperparameter optimization, as described in "BOHB: Robust and Efficient Hyperparameter Optimization at Scale", by Falkner, et al., in Proceedings of the 35th International Conference on Machine Learning, July 2018, which is incorporated herein by reference. This optimization technique is applicable to any sort of hyperparameters, whether those hyperparameters are discrete or continuous. Specifically, BOHB involves parallel training runs using various random vectors in hyperparameter space (i.e., a space having one dimension for each hyperparameter being tuned) and determining which of these hyperparameter vectors gives the best results (i.e., results in a trained network that is most predictive for new input data). Some embodiments then select several vectors nearby to this identified best result, and perform additional training runs using these different hyperparameter value vectors.

Figure 11:
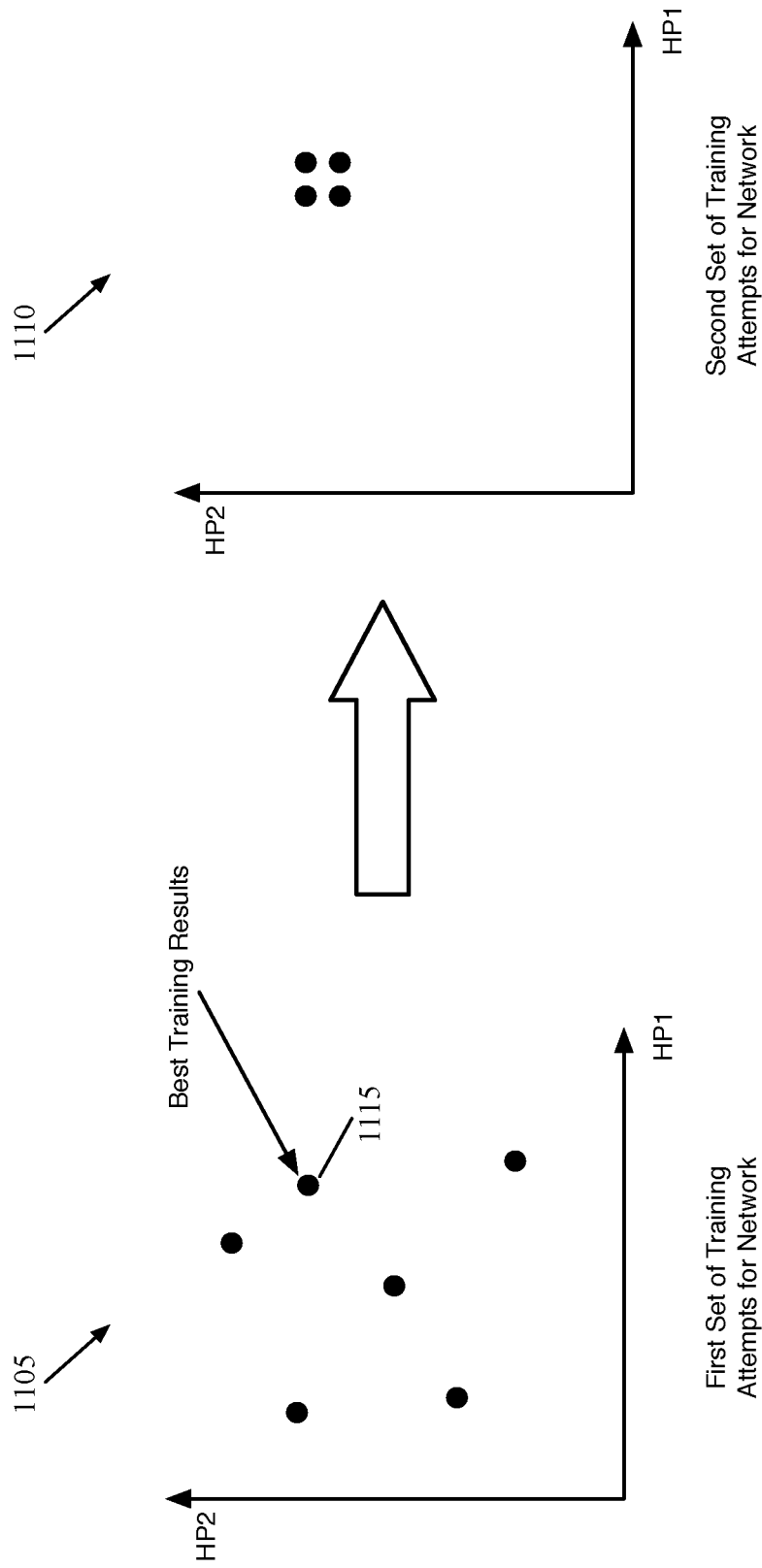
FIG. 11 conceptually illustrates a Bayesian optimization and hyperband process for a network with two hyperparameters.

FIG. 11 conceptually illustrates this process for a network with only two hyperparameters (hyperparameter space will typically have more than two dimensions, but this example is limited to two hyperparameters for ease of visualization). As shown in the first stage 1105, various hyperparameter vectors are selected (e.g., randomly), and training runs are performed (e.g., in parallel) using the values specified by each vector. In this case, the point 1115 represents the hyperparameter vector that yields the best results (i.e., the most predictive network). On the premise that results (i.e., network predictiveness) vary smoothly within hyperparameter space, the second stage 1110 shows that for the next set of training runs, vectors surrounding the point 1115 in hyperparameter space are selected.

BOHB has the benefit that, because gradients are not taken of hyperparameters, it can be applied to hyperparameters that have either continuous or discrete possible values. However, as the number of hyperparameters being tuned increases, the difficulty of adequately exploring hyperparameter space quickly increases as well. In addition, once a best hyperparameter vector is found from an initial set of vectors, the requisite number of next attempt hyperparameter vectors also quickly increases.

Instead, some embodiments use a bilevel optimization approach, as described in "Self-Tuning Networks: Bilevel Optimization of Hyperparameters Using Structured Best-Response Functions", by MacKay, et al., available at https://arxiv.org/pdf/1903.03088.pdf, March 2019, which is incorporated herein by reference. In some embodiments, the validation system 350 of FIG. 3 uses bilevel optimization to tune hyperparameters based on their effects on validation inputs. That is, gradients of a first training loss function is used by the training system 300 to tune the network parameters (weights, biases, etc.) while gradients of a second validation loss function (which is a modification to the training loss function that accounts for changes to hyperparameters) is used to tune the hyperparameters.

Using a bilevel optimization approach such as that described in the "Self-Tuning Networks" paper incorporated by reference above enables a network training and validation system to tune the hyperparameters. In addition, iteratively tuning the hyperparameters using such an approach while tracking a description length score allows such an approach to be performed without overfitting the hyperparameters. Using such techniques without such an iterative process that includes a description length score may result in overfitting of the hyperparameters, which in turn leads to overfitting of the network parameters. Without the rigorous tracking of the amount of change to the hyperparameters, information about the validation inputs may be encoded into the hyperparameter changes, thereby overfitting the network to these inputs (and causing subsequent validation runs to be tainted).

Figure 12:
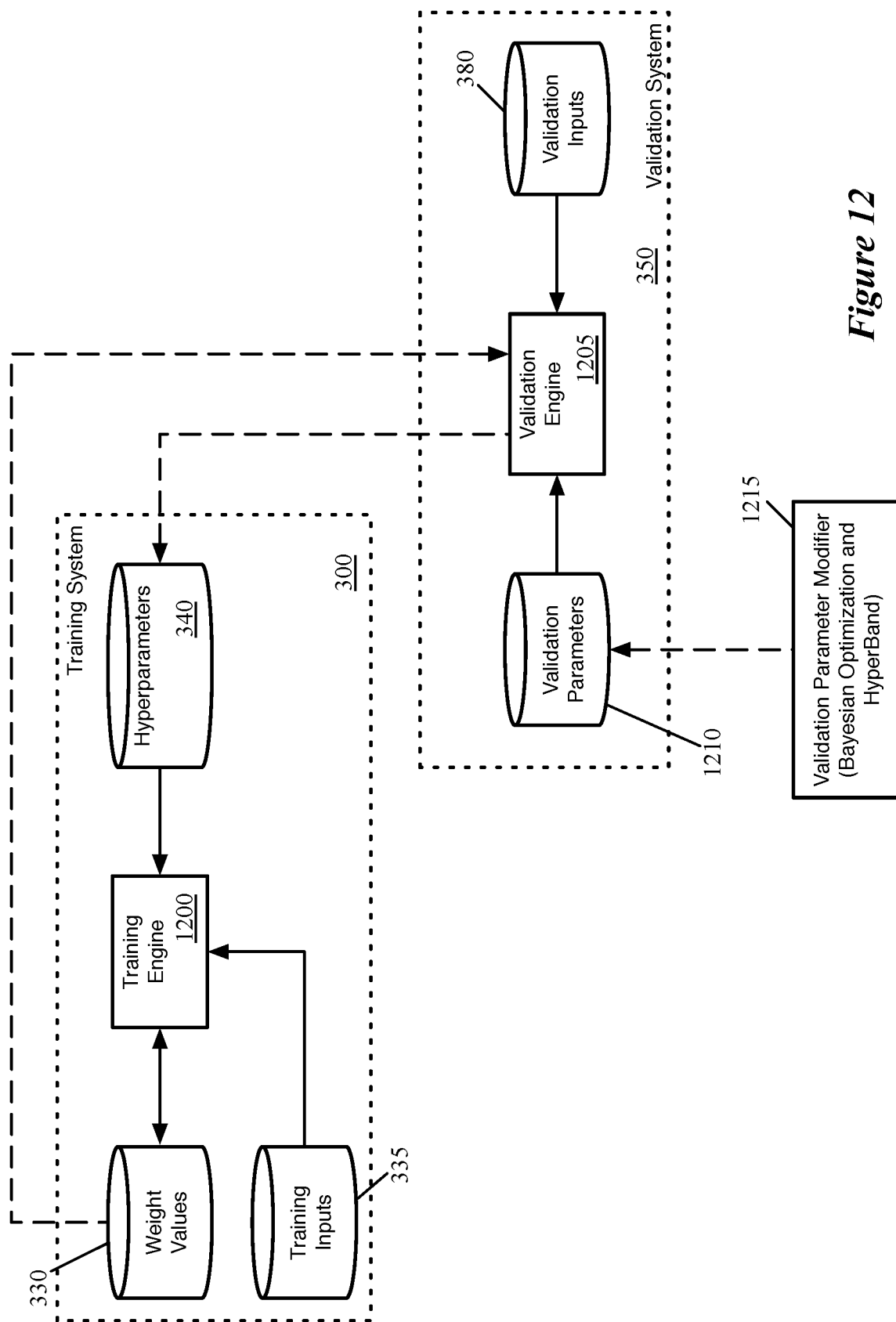
FIG. 12 conceptually illustrates using a Bayesian optimization and hyperband framework to tune parameters of bilevel optimization.

Some embodiments also use both of these techniques together; e.g., by using the Bayesian optimization and hyperband framework to tune parameters of the bilevel optimization (i.e., hyper-hyperparameters). FIG. 12 conceptually illustrates this combination of techniques. This figure shows that the training system 300 includes a training engine 1200 (i.e., representing several of the training modules shown in FIG. 3) using a set of hyperparameters 340 that take training inputs 335 to train the weight values 330 (and other network parameters). The validation engine 1205 of validation system 350 of some embodiments uses the bilevel optimization gradient descent-based technique, using validation inputs 380 to perform validation and tune the hyperparameters 340. In addition, this operation is governed by a set of validation parameters 1210 in some embodiments. These validation parameters 1210 are optimized by the validation parameter modifier 1215, which uses Bayesian optimization and hyperband techniques to tune these validation parameters.

In addition to hyperparameters such as the learning rate, regularization, etc., some embodiments use similar techniques (i.e., iterative tuning using a prequential approach that is tracked with a description length score) to modify other aspects of the training and/or the network itself. For example, different embodiments may modify the actual loss function being used, which and how often each training data point should be used, the type of activation function(s) used in the non-linear components of the computation nodes of the network, and/or the structure of the network (e.g., the sizes of the layers, the types of layers, etc.), as well as other features of the training process and/or the network.

In some embodiments, the network validation system modifies one or more of these aspects of the training process and/or the network by using a function to represent the aspect that is continuously differentiable with respect to a measure of network predictiveness (e.g., the description length score). As described above, the description length score is a measure of network predictiveness based on the minimum description length principle that a more compressible MT network will be more predictive for new inputs. Using a continuously differentiable function allows the network validation system to compute the gradient of this continuously differentiable function with respect to the predictiveness measure and use a gradient-based technique to adjust the training and/or network feature.

For the loss function, having a discrete set of possible loss functions (e.g., a logarithmic function and a quadratic function) would not be continuously differentiable, as there is no continuous function. However, variables can be defined such that a complete loss function is defined as a first variable (A) multiplied by the logarithmic function summed with a second variable (B) multiplied by the quadratic function. This defines an infinite set of possible loss functions based on the values for variables A and B, and each of these variables can be differentiated with respect to the predictiveness (using the validation set in, e.g., the manner described above). For systems with many possible loss functions, different variables can be defined for each possible loss function, and similar techniques used.

In addition, by iteratively validating the trained network and modifying the loss function based on the validation set (part of which is then incorporated into the training set), not only can the validation system identify an optimized singular loss function, but some embodiments identify an optimal sequence of loss functions that results in the most predictive network. Using the above example, it might be optimal to have a logarithmic loss function for the initial training run, but later in the set use a quadratic loss function (or a combination of both).

Furthermore, while the example above (a linear combination of specific potential loss functions) is simple, some embodiments use a more generalized set of basis functions that allow the loss function optimization algorithm to construct any sufficiently smooth (i.e., differentiable) function. For instance, different embodiments could use a set of basis functions (e.g., Fourier or wavelet basis functions) to construct an optimized loss function (including a loss function that evolves over time).

To further generalize the loss function optimization, some embodiments use a piece of code that can be evolved according to bilevel optimization (as constrained by the prequential techniques to prevent the evolution process from "cheating" that leads to overfitting) as a description of the loss function. Some embodiments use parse trees for computations to represent possible loss functions, with operators at the nodes and operands at the leaves. The space of possible trees can be searched to identify an optimal loss function.

In addition, as mentioned, some embodiments use prequential techniques to optimize the non-linear activation function or functions used in the network. As one option, some embodiments use a linear combination of possible activation functions, similar to the technique described above for the loss function. For instance, some embodiments use a first variable multiplied by a ReLU or leaky ReLU function, a second variable multiplied by a tanh function, a third variable multiplied by a sigmoid function, etc., such that the linear combination is differentiable in each of the variables with respect to the predictiveness score.

In some embodiments, the network is trained for execution by a neural network inference circuit that uses a lookup table (LUT) to implement activation functions. In this case, the space of available activation functions is defined by the number of input and output bits of the LUT. For instance, for a LUT that maps a 5-bit input to a 4-bit output, any activation function (e.g., including both monotonic and non-monotonic activation functions) that maps each of the 32 possible inputs to one of the 16 possible outputs is an option for the activation function. In some embodiments, this allows for the training and validation system to define a piecewise linear model of an arbitrary function, with up to a particular number (i.e., the number of possible outputs for the LUT) of knots (i.e., points at which the piecewise linear function changes direction). The training and validation system can differentiate the description length score with respect to the location of these knots.

In some embodiments, this allows the training and validation system to compensate for quantization of the output activation values. For example, most of the output activation values generated by a particular computation node (neuron) for a given training set might be concentrated within a small range of the overall interval for possible outputs. Rather than have a number of the sections of the piecewise function that are never or rarely used, the system of some embodiments can non-linearly transform (either deterministically or differentiably) the non-uniform distribution into a more uniform distribution (e.g., by moving the locations of the knots with respect to the input values). To do this, in some embodiments, the system selects an activation function that maximizes entropy (i.e., that maximizes the utility and expressiveness of the bits used for the activation function).

As noted above, some embodiments use the above-described prequential techniques to modify the network structure. This can include defining whether or not to include specific edges between computation nodes of the network, how many and what type of layers to include (e.g., how many convolutional layers in between sets of pooling layers, etc.). One way to accomplish this is to define each edge (between computation nodes, between possible layers, etc.) as either in or out of the network. Logically, this is a linear combination of many millions (or billions or larger) of possible networks, and the training and validation system can optimize which edges are kept in the network. Other embodiments use a parametric characterization of a function that generates a network structure, and use the prequential techniques to modify this function (e.g., by differentiating the description length score with respect to the parameters of the network-generation function). While a brute force search for an optimal network structure can be carried out using the computing power of a massive datacenter, using prequential techniques can greatly reduce the resources required to achieve a similar result by optimizing this search.

In addition to modifying hyperparameters (e.g., VIB parameters, regularization, learning rate, etc.), the loss function itself, or aspects of the network (e.g., network structure, activation functions, etc.), some embodiments use the prequential techniques to select an optimized training set. As described above, in the sender/receiver formulation, the sender and receiver both have the training data inputs, and the information transfer measured by the description length score is the bits required for the sender to provide the receiver with the correct output (or the error from the output generated by the receiver to the correct output). The iterative transfer of inputs from the validation set to the training set provides the receiver with the correct output for a portion of the previous validation set so that the corresponding inputs can be added to the training set for the next training run.

In the previous description, the inputs for each transfer to the validation set are selected randomly by the validation system. In some cases, using an optimized group of inputs would allow the training of the network to converge faster than it would with a randomly selected group of inputs. However, selecting this group of inputs requires a large number of bits because N choose K grows rapidly in N (and in K, as K approaches N/2). However, rather than providing the training system with the specific selections, some embodiments instead provide the training set with a program that allows it to rank the training inputs, and select the K optimal inputs. In addition to modifying the hyperparameters of the actual training algorithm, the hyperparameters of this input selection algorithm can be modified using the same formula. If the number of bits used to modify the input selection algorithm hyperparameters is less than the number of bits saved for modifying the training algorithm hyperparameters, a lower description length score can be achieved (and thus the network will be more predictive).

Once trained, the networks of some embodiments can be compiled into a set of program instructions for a machine-trained network inference circuit that implements such networks using real-world inputs. Such a machine-trained network inference circuit of some embodiments can be embedded into various different types of devices in order to perform different purposes (e.g., face recognition, object categorization, voice analysis, etc.). For each type of device, a network is trained, and the network parameters are stored with the neural network inference circuit to be executed on the device. These devices can include mobile devices, desktop computers, Internet of Things (IoT devices), etc.

Figure 13:
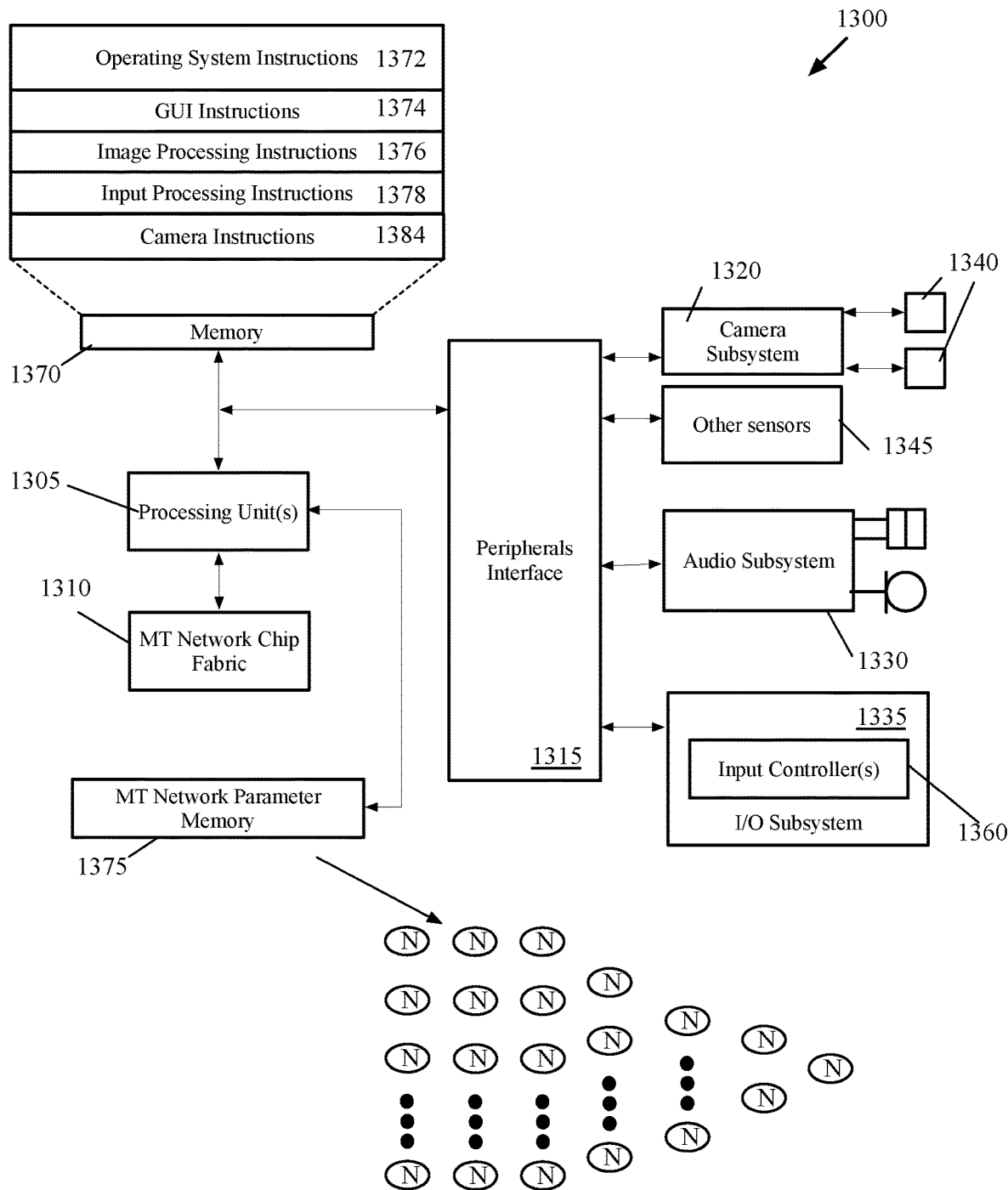
FIG. 13 is an example of an architecture of an electronic device that includes the neural network integrated circuit of some embodiments.

FIG. 13 is an example of an architecture 1300 of an electronic device that includes a machine-trained network integrated circuit of some embodiments. The electronic device may be a mobile computing device such as a smartphone, tablet, laptop, etc., or may be another type of device (e.g., an IoT device, a personal home assistant). As shown, the device 1300 includes one or more general-purpose processing units 1305, a machine-trained network chip fabric 1310, and a peripherals interface 1315.

The peripherals interface 1315 is coupled to various sensors and subsystems, including a camera subsystem 1320, an audio subsystem 1330, an I/O subsystem 1335, and other sensors 1345 (e.g., motion/acceleration sensors), etc. The peripherals interface 1315 enables communication between the processing units 1305 and various peripherals. For example, an orientation sensor (e.g., a gyroscope) and an acceleration sensor (e.g., an accelerometer) can be coupled to the peripherals interface 1315 to facilitate orientation and acceleration functions. The camera subsystem 1320 is coupled to one or more optical sensors 1340 (e.g., charged coupled device (CCD) optical sensors, complementary metal-oxide-semiconductor (CMOS) optical sensors, etc.). The camera subsystem 1320 and the optical sensors 1340 facilitate camera functions, such as image and/or video data capturing.

The audio subsystem 1330 couples with a speaker to output audio (e.g., to output voice navigation instructions). Additionally, the audio subsystem 1330 is coupled to a microphone to facilitate voice-enabled functions, such as voice recognition, digital recording, etc. The I/O subsystem 1335 involves the transfer between input/output peripheral devices, such as a display, a touch screen, etc., and the data bus of the processing units 1305 through the peripherals interface 1315. The I/O subsystem 1335 includes various input controllers 1360 to facilitate the transfer between input/output peripheral devices and the data bus of the processing units 1305. These input controllers 1360 couple to various input/control devices, such as one or more buttons, a touchscreen, etc.

In some embodiments, the device includes a wireless communication subsystem (not shown in FIG. 13) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 13, a memory 1370 (or set of various physical storages) stores an operating system (OS) 1372. The OS 1372 includes instructions for handling basic system services and for performing hardware dependent tasks. The memory 1370 also stores various sets of instructions, including (1) graphical user interface instructions 1374 to facilitate graphic user interface processing; (2) image processing instructions 1376 to facilitate image-related processing and functions; (3) input processing instructions 1378 to facilitate input-related (e.g., touch input) processes and functions; and (4) camera instructions 1384 to facilitate camera-related processes and functions. The processing units 1305 execute the instructions stored in the memory 1370 in some embodiments.

The memory 1370 may represent multiple different storages available on the device 1300. In some embodiments, the memory 1370 includes volatile memory (e.g., high-speed random access memory), non-volatile memory (e.g., flash memory), a combination of volatile and non-volatile memory, and/or any other type of memory.

The instructions described above are merely exemplary and the memory 1370 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1375 stores the weight values, bias parameters, etc. for implementing one or more machine-trained networks by the MT network chip fabric 1310. In some embodiments, different clusters of the chip fabric 1310 can implement different machine-trained networks in parallel in some embodiments. In different embodiments, these neural network parameters are stored on-chip (i.e., in memory that is part of the MT network chip fabric 1310) or loaded onto the chip fabric 1310 from the neural network parameter memory 1375 via the processing unit(s) 1305. For instance, some embodiments load some or all of these network parameters at the time the chip fabric 1310 is booted up, and the parameters are then stored on the chip until the chip is shut down.

While the components illustrated in FIG. 13 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1305 and the MT network chip fabric 1310, which enables the processing units 1305 to provide inputs to the MT network chip fabric 1310 and receive the outputs of the network from the chip fabric 1310. Also, while many of the functions have been described as being performed by one component, one of ordinary skill in the art will realize that the functions described with respect to FIG. 13 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
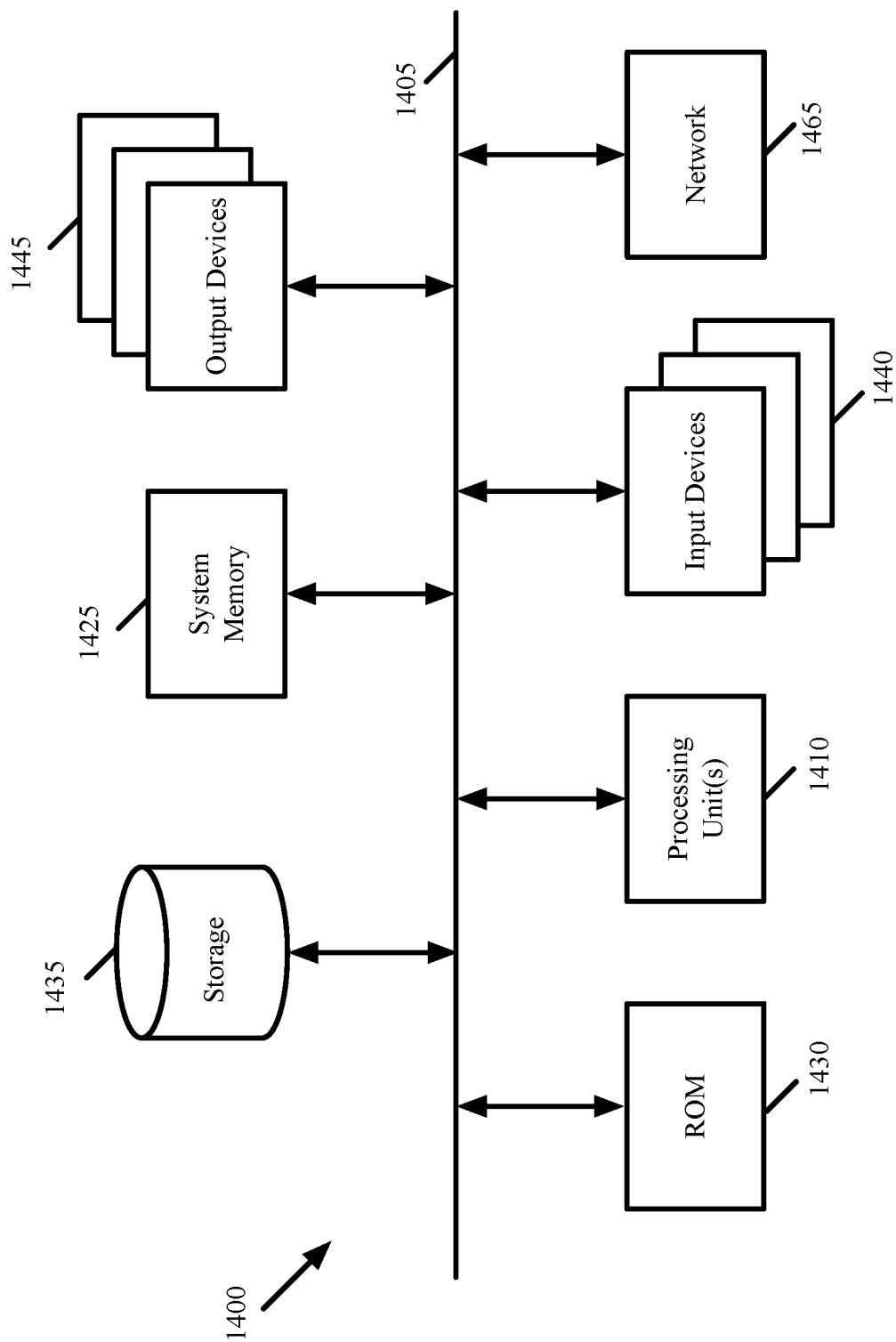
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the applications (e.g., the training application) described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieves instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet), or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a machine-trained (MT) network, the method comprising:
   using a first set of inputs to train parameters of the MT network according to a set of hyperparameters that define aspects of the training by (i) computing a value of a first loss function based on propagation of the first set of inputs through the MT network and (ii) modifying the MT network parameters based on gradients of the first loss function with respect to the parameters at the computed value;
   using a second set of inputs to validate the MT network as trained by the first set of inputs by:
      propagating the second set of inputs through the MT network with the modified parameters to generate a second set of outputs; and
      for each input of the second set of inputs, measuring a difference between (i) the output generated by propagating the input through the MT network with the modified parameters and (ii) an expected output for the input; and
   based on the validation, modifying the hyperparameters for subsequent training of the MT network based on gradients of a description length score with respect to the hyperparameters, wherein the description length score constrains the hyperparameter modification to prevent overfitting of the modified hyperparameters to the second set of inputs by accounting for (i) the difference measurements for each input of the second set of inputs and (ii) the modifications to the hyperparameters.

2. The method of claim 1, wherein the description length score (i) quantifies information provided to modify the hyperparameters and (ii) is minimized to constrain the hyperparameter modification.

3. The method of claim 2, wherein the description length score further quantifies a measure of information required to provide data regarding new training inputs for the subsequent training of the MT network.

4. The method of claim 3, wherein the new training inputs are part of the second set of inputs.

5. The method of claim 1, wherein propagation of the first set of inputs through the MT network generates a first set of outputs and the computed value of the first loss function measures a difference, for each input of the first set of inputs, between the output generated by propagating the input through the MT network and an expected output for the input.

6. The method of claim 1, wherein the description length score incorporates the first loss function to account for error due to modification of the hyperparameters.

7. The method of claim 6, wherein gradients of the description length score with respect to the hyperparameters incorporate gradients of the first loss function with respect to the parameters accounting for modifications to the hyperparameters.

8. The method of claim 1 further comprising:
   using a third set of inputs to further train the parameters of the MT network according to the modified set of hyperparameters;
   using a fourth set of inputs to validate the MT network as trained by the third set of inputs; and
   based on the validation with the fourth set of inputs, further modifying the hyperparameters for subsequent training of the MT network.

9. The method of claim 8, wherein:
   the third set of inputs comprises (i) the first set of inputs and (ii) a subset of the second set of inputs; and
   the fourth set of inputs comprises the second set of inputs without the subset that is part of the third set of inputs.

10. A non-transitory machine-readable medium storing a program which when executed by at least one processing unit trains a machine-trained (MT) network, the program comprising sets of instructions for:
   using a first set of inputs to train parameters of the MT network according to a set of hyperparameters that define aspects of the training by i) computing a value of a first loss function based on propagation of the first set of inputs through the MT network and (ii) modifying the MT network parameters based on gradients of the first loss function with respect to the parameters at the computed value;
   using a second set of inputs to validate the MT network as trained by the first set of inputs by:
      propagating the second set of inputs through the MT network with the modified parameters to generate a second set of outputs; and
      for each input of the second set of inputs, measuring a difference between (i) the output generated by propagating the input through the MT network with the modified parameters and (ii) an expected output for the input; and
   based on the validation, modifying the hyperparameters for subsequent training of the MT network based on gradients of a description length score with respect to the hyperparameters, wherein the description length score constrains the hyperparameter modification to prevent overfitting of the modified hyperparameters to the second set of inputs by accounting for (i) the difference measurements for each input of the second set of inputs and (ii) the modifications to the hyperparameters.

11. The non-transitory machine-readable medium of claim 10, wherein the description length score (i) quantifies information provided to modify the hyperparameters and (ii) is minimized to constrain the hyperparameter modification.

12. The non-transitory machine-readable medium of claim 11, wherein the description length score further quantifies a measure of information required to provide data regarding new training inputs for the subsequent training of the MT network.

13. The non-transitory machine-readable medium of claim 12, wherein the new training inputs are part of the second set of inputs.

14. The non-transitory machine-readable medium of claim 10, wherein propagation of the first set of inputs through the MT network generates a first set of outputs and the computed value of the first loss function measures a difference, for each input of the first set of inputs, between the output generated by propagating the input through the MT network and an expected output for the input.

15. The non-transitory machine-readable medium of claim 10, wherein the description length score incorporates the first loss function to account for error due to modification of the hyperparameters.

16. The non-transitory machine-readable medium of claim 15, wherein gradients of the description length score with respect to the hyperparameters incorporate gradients of the first loss function with respect to the parameters accounting for modifications to the hyperparameters.

17. The non-transitory machine-readable medium of claim 10, wherein the program further comprises sets of instructions for:
  using a third set of inputs to further train the parameters of the MT network according to the modified set of hyperparameters;
  using a fourth set of inputs to validate the MT network as trained by the third set of inputs; and
  based on the validation with the fourth set of inputs, further modifying the hyperparameters for subsequent training of the MT network.

18. The non-transitory machine-readable medium of claim 17, wherein:
  the third set of inputs comprises (i) the first set of inputs and (ii) a subset of the second set of inputs; and
  the fourth set of inputs comprises the second set of inputs without the subset that is part of the third set of inputs.

\* \* \* \* \*